United States Patent
Bontu et al.

(10) Patent No.: US 9,521,600 B2
(45) Date of Patent: Dec. 13, 2016

(54) HANDOVER MECHANISM IN CELLULAR NETWORKS

(71) Applicant: BlackBerry Limited, Waterloo (CA)

(72) Inventors: Chandra Sekhar Bontu, Nepean (CA); Yi Song, Plano, TX (US); Zhijun Cai, Euless, TX (US); Shalini Suresh Periyalwar, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 338 days.

(21) Appl. No.: 13/752,316

(22) Filed: Jan. 28, 2013

(65) Prior Publication Data

US 2014/0211756 A1 Jul. 31, 2014

(51) Int. Cl.
H04W 36/04 (2009.01)
H04W 36/02 (2009.01)
H04W 84/04 (2009.01)

(52) U.S. Cl.
CPC ........... *H04W 36/04* (2013.01); *H04W 36/026* (2013.01); *H04W 84/045* (2013.01)

(58) Field of Classification Search
CPC . H04W 36/04; H04W 36/0036; H04W 84/045
See application file for complete search history.

(56) References Cited

U.S. PATENT DOCUMENTS

| | | | |
|---|---|---|---|
| 2007/0081492 A1* | 4/2007 | Petrovic | H04L 1/1812 370/331 |
| 2008/0188223 A1* | 8/2008 | Vesterinen et al. | 455/436 |
| 2008/0233963 A1* | 9/2008 | Alanara et al. | 455/438 |
| 2009/0046573 A1 | 2/2009 | Damnjanovic | |
| 2009/0111476 A1* | 4/2009 | Hamalainen | H04W 72/02 455/450 |
| 2010/0027497 A1* | 2/2010 | Pelletier | 370/329 |
| 2012/0002643 A1* | 1/2012 | Chung et al. | 370/331 |
| 2012/0039299 A1* | 2/2012 | Teyeb et al. | 370/331 |

(Continued)

FOREIGN PATENT DOCUMENTS

| | | |
|---|---|---|
| EP | 2309795 | 4/2011 |
| EP | 2343919 | 7/2011 |

(Continued)

OTHER PUBLICATIONS

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).

(Continued)

*Primary Examiner* — Redentor Pasia
(74) *Attorney, Agent, or Firm* — Fish & Richardson P.C.

(57) ABSTRACT

Systems, apparatuses, and methods for a handover procedure in heterogeneous networks are provided. In particular, an intermediate handover (IHO) is introduced. Certain aspects of the disclosure involve, a method, performed at a first base station of a wireless communications network. An indication that a user equipment (UE) is receiving coverage signal from a second base station can be received. A data packet destined for the UE can be transmitted to the second base station. A communications link with the UE can be maintained after transmitting the data packet to the second base station.

16 Claims, 18 Drawing Sheets

(56) References Cited

U.S. PATENT DOCUMENTS

| | | |
|---|---|---|
| 2012/0039302 A1* | 2/2012 | Chun et al. ............... 370/331 |
| 2012/0057474 A1 | 3/2012 | Hirano et al. |
| 2012/0218970 A1 | 8/2012 | Westgerg et al. |
| 2012/0269174 A1 | 10/2012 | Yang et al. |
| 2012/0314690 A1* | 12/2012 | Xu et al. ............... 370/331 |
| 2013/0130688 A1 | 5/2013 | Chin et al. |
| 2013/0316712 A1* | 11/2013 | Lee ............... H04W 36/00 |
| | | 455/436 |
| 2014/0023042 A1 | 1/2014 | Westberg |
| 2014/0023045 A1 | 1/2014 | Li et al. |
| 2014/0050197 A1 | 2/2014 | Legg et al. |

FOREIGN PATENT DOCUMENTS

| | | |
|---|---|---|
| EP | 2190241 | 3/2012 |
| WO | 2011/020062 | 2/2011 |
| WO | 2011/156769 | 12/2011 |

OTHER PUBLICATIONS

International Search Report and Written Opinion of the International Searching Authority issued in International Application No. PCT/US2013/023386 on Oct. 16, 2013; 10 pages.

International Search Report and Written Opinion of the International Searching Authority issued in International Application No. PCT/US2013/023497 on Oct. 15, 2013; 13 pages.

International Preliminary Report on Patentability and Written Opinion in International Application No. PCT/US2013/023386, dated Jul. 28, 2015, 8 pages.

Office Action issued in Canadian Application No. 2899192 on Jul. 13, 2016.

Office Action issued in related Canadian Application No. 2899186 on Sep. 19, 2016.

\* cited by examiner

HANDOVER MECHANISM IN CELLULAR NETWORKS

FIELD

This disclosure relates to handover procedures in cellular wireless networks, and more particularly, in heterogeneous networks.

BACKGROUND

Wireless communication systems can include a network of one or more base stations to communicate with one or more user equipment (UE) such as fixed and mobile wireless communication devices, mobile phones, or laptop computers with wireless communication cards. Base stations are spatially distributed to provide radio coverage in a geographic service area that is divided into cells. A UE that is located within a base station's cell of coverage area is generally registered with the base station. The UE and the base station communicate with each other via radio signal. The base station is called the serving base station of the UE and the cell associated with the base station is called the serving cell of the UE.

In some wireless networks, cells of different coverage sizes may be deployed to improve cell coverage or to offload traffic. For example, in an Evolved Universal Terrestrial Radio Access Network (E-UTRAN), small cells (e.g., pico cells, relay cells, or femto cells) may be deployed with overlaid macro cells. A network including large cells (e.g., macro cells) as well as small cells (e.g., pico cells, relay cells, femto cells) may be referred to as a heterogeneous network. A UE in the heterogeneous network may move in a large geographical area which may trigger a handover procedure and result in changing of the UE's serving cells.

BRIEF DESCRIPTION OF DRAWINGS

For a more complete understanding of this disclosure, reference is now made to the following brief description of the drawings, taken in connection with the accompanying drawings and detailed description, wherein like reference numerals represent like parts.

DETAILED DESCRIPTION

Figure 1:
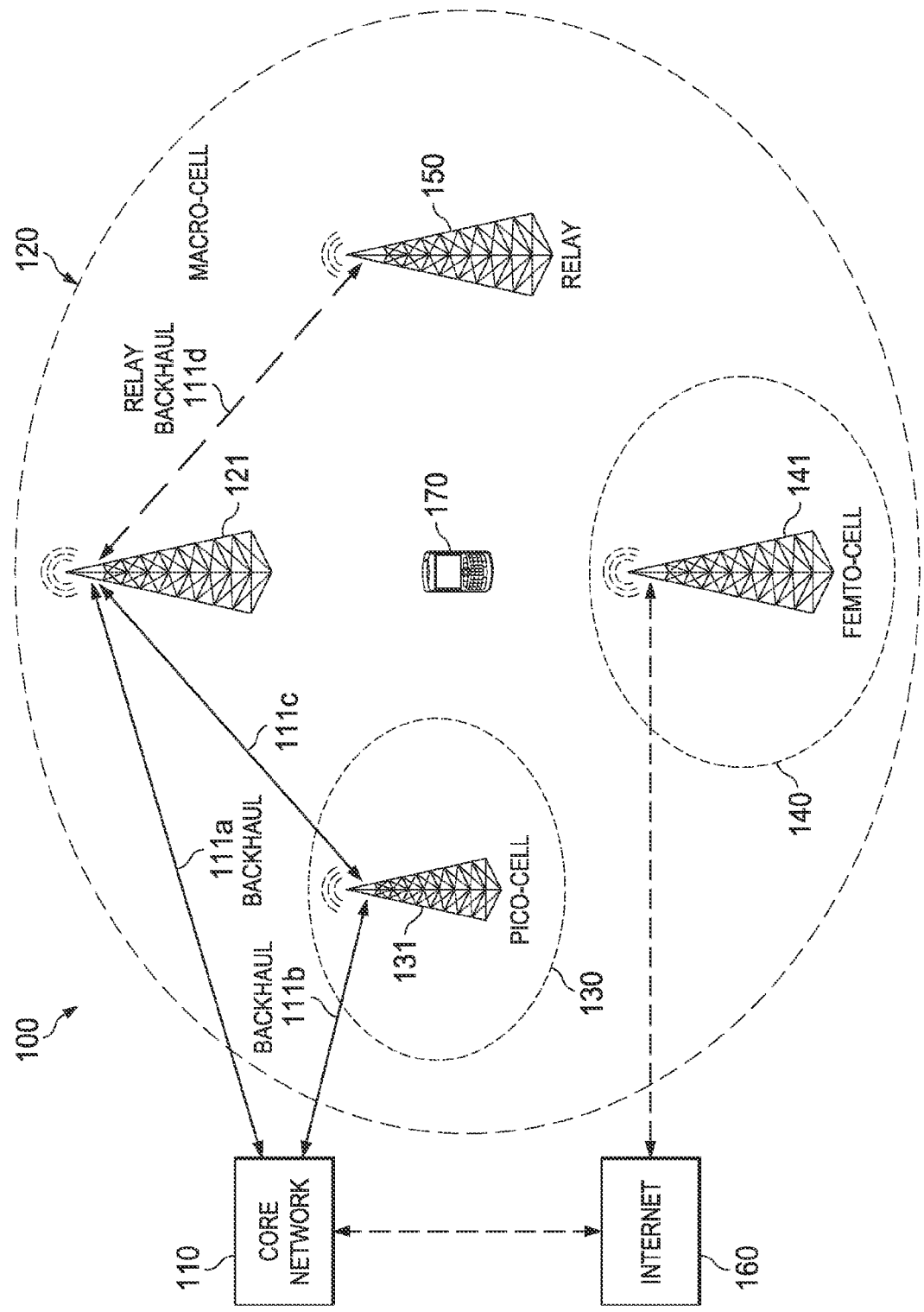
FIG. 1 is a schematic representation of an example heterogeneous wireless communications network.

The present disclosure is directed to systems, methods, and apparatuses for handover in wireless communications networks, especially in heterogeneous wireless communications networks. Heterogeneous networks may include cells of various coverage sizes resulting at least in part from different transmission power levels of base stations, e.g., macro cell, femto cell, pico cell, relay cell, etc. As the UE moves across cell boundaries, a handover procedure may be performed to ensure that the UE is connected or camped on a serving cell with good coverage for the UE.

Since the heterogeneous network may contain various types of cells, there may be overlaps between coverage areas of multiple cells, especially in unplanned clustered cell deployments where a large number of small cells may be situated within a macro cell's coverage area. When a UE traverses between adjacent cells with overlapped coverage area, there might be multiple handovers. The UE may only stay with one cell for a short time before it switches to another cell. Frequently switching a UE among multiple cells may incur significant signalling overhead, delay, data interruptions, and/or quality of service (QoS) degradation.

To improve the QoS, an intermediate handover (IHO) state can be introduced to reduce unnecessary and unwanted handovers. The UE may be in the IHO state before it is handed over to a target cell completely. During the IHO state, the UE can be connected to the serving cell as well as one or more neighbouring cells. The neighbouring cells that are connected to the UE during the IHO state are referred to as IHO candidate cells. One cell that actively transmits data to the UE is referred to as the Anchor cell. The IHO state can be transparent to the core network. Therefore, the IHO state can also be referred to as a network agnostic mobility management (NA-MM) state.

Certain protocol and signaling changes can be made to incorporate the IHO state in handover procedures.

Certain aspects of the disclosure pertain to a method performed at a first base station of a wireless communications network. The first base station can receive an indication that a user equipment (UE) is receiving coverage signal from a second base station. The information destined for the UE can be forwarded to the second base station. A communications link can be maintained with the UE after transmitting the data packet to the second base station.

In certain implementations, the indication is a quality of service indicator.

In certain implementations, the coverage signal includes one or more of: a reference signal, a system information broadcast signal, or a data transmission signal transmitted by a base station.

Certain aspects of the implementations may also include receiving a data packet destined to the Evolved Packet Core (EPC) from the second base station and maintaining a communications link with the UE after receiving the data packet from the second base station.

In certain implementations, forwarding the data packet may also include receiving the data packet from the second base station. The data packet can be decrypted to form Packet Data Convergence Protocol (PDCP) Service Data Unit (SDU). The encrypted data packet can be forwarded to the EPC.

In certain implementations, receiving the data packet destined for the EPC from the second base station is performed across an X2 interface.

In certain implementations, receiving the data packet destined for the EPC from the second base station is performed across an S1 interface.

In certain implementations, maintaining the communication link with the UE includes maintaining RRC_connected state with the UE.

In certain implementations, maintaining the RRC_connected state with the UE includes reserving the C-RNTI assigned for the UE.

In certain implementations, forwarding the data packet may also include receiving the data packet from the EPC. The data packet can be encrypted to form PDCP PDU. The encrypted data packet can be forwarded to the second base station.

In certain implementations, forwarding the data packet destined for the UE to the second base station is performed across an X2 interface.

In certain implementations, forwarding the data packet destined for the UE to the second base station is performed across an S1 interface.

In certain implementations, maintaining the communication link with the UE includes maintaining RRC_connected state with the UE.

In certain implementations, maintaining the RRC_connected state with the UE includes reserving the C-RNTI assigned for the UE.

Certain aspects of the implementations may also include receiving an indication that the coverage signal from the second base station is stronger than a coverage signal from the first base station. Control of communications for the UE can be handed to the second base station. The communications link with the UE can be terminated.

In certain implementations, the indication is a quality of service indicator.

Certain aspects of the implementations are directed to systems, apparatuses, and methods performed at a first base station of a wireless communications network. A request for an intermediate handover (IHO) can be received from a second base station. The request to perform the IHO can be accepted, wherein the first station acting as an IHO candidate base station. A data packet destined for a UE can be received from the second base station. transmitting the received data packet to the UE. A communications link with the UE can be maintained after receiving the data packet from the second base station.

In certain implementations, transmitting the data packet to the UE may also include receiving a data packet from the second base station to form the PDCP PDU. The encrypted data packet (PDCP PDU) can be forwarded to the UE.

In certain implementations, maintaining the communication link with the UE includes maintaining RRC_connected state with the UE.

In certain implementations, maintaining the RRC_connected state with the UE includes reserving the C-RNTI assigned for the UE.

Certain implementations may also include receiving an indication that the coverage signal from second base station is stronger than a coverage signal from the first base station.

The second base station and the UE can be informed about the indication. The communications link with the UE can be terminated.

In certain implementations, the indication is a quality of service indicator.

In certain implementations, receiving the data packet destined for the UE from the second base station is performed across an X2 interface.

In certain implementations, receiving the data packet destined for the UE from the second base station is performed across an S1 interface.

Certain aspects are directed to systems, apparatuses, and methods performed at a first base station of a wireless communications network. A data packet can be received from a UE. A data packet destined for the EPC can be forwarded to a second base station. A communications link can be maintained with the UE after transmitting the data packet to the second base station.

In certain implementations, forwarding the data packet can include receiving the PDCP PDU from the UE and forwarding the PDCP PDU to the second base station.

In certain implementations, forwarding the data packet destined for the EPC to the second base station is performed across an X2 interface.

In certain implementations, forwarding the data packet destined for the EPC to the second base station is performed across an S1 interface.

In certain implementations, maintaining the communication link with the UE includes maintaining RRC_connected state with the UE.

In certain implementations, maintaining the RRC_connected state with the UE includes reserving the C-RNTI assigned for the UE.

Certain implementations can also include a serving base station configured to receive an indication that a user equipment (UE) is receiving coverage signal from a second base station. The serving base station can transmit a data packet destined for the UE to the second base station and maintain a communications link with the UE after transmitting the data packet to the second base station.

A neighboring base station can be configured to receive the data packet from the serving base station and transmit the data packet to the UE.

In certain implementations, the serving base station transmits the data packet to the neighboring base station across an X2 interface.

In certain implementations, the serving base station transmits the data packet to the neighboring base station across an S1 interface.

In certain implementations, the system is configured to allocate a cell radio network temporary identifier (C-RNTI) to the neighboring base station.

In certain implementations, the neighboring base station is configured to determine that the UE has a C-RNTI that matches the C-RNTI of the neighboring base station.

In certain implementations, the system is configured to assign a new C-RNTI to the neighboring base station.

Certain implementations are directed to systems, apparatuses, and methods performed at a serving base station of a wireless communications network, the base station in communication with a user equipment (UE). A measurement report can be received from the UE, the measurement report indicating a quality of service for the source base station and one or more neighboring base stations. An X2AP handover request message can be transmitted to at least a subset of the one or more neighboring base stations, the X2AP handover request message indicating an intermediate handover (IHO)

state. A handover request acknowledgement message can be received from the at least a subset of the one or more neighboring base stations, the handover request acknowledgement message including a radio resource control (RRC) reconfiguration message. The RRC reconfiguration message can be transmitted to the UE.

Certain implementations may also include identifying the at least a subset of the one or more neighboring base stations based on the quality of service for the one or more neighboring base stations indicated in the measurement report.

In certain implementations, the handover request acknowledgement message includes one or more of a cell radio network temporary identifier, a security algorithm identifier, or a random access channel preamble.

In certain implementations, the handover request acknowledgement message includes an intermediate handover state acceptance indicator.

In certain implementations, the handover request message includes at least the IDs of a set of candidate cells.

In certain implementations, the handover request acknowledgement message includes an indicator of whether the uplink synchronization with the UE is to be performed.

In certain implementations, the serving base station is an anchor base station of the IHO state.

Certain implementations may also include transmitting an X2AP IHO anchor functionality transfer request message to a target base station. An RRC reconfiguration message can be transmitted to the UE, the RRC reconfiguration message including IHO anchor transfer parameters. An RRC reconfiguration acknowledge message can be received from the UE. An X2AP IHO anchor functionality transfer response message can be received from the target base station.

In certain implementations, the target base station is a IHO candidate base station.

Certain implementations may also include forwarding DL data to the target base station.

Certain implementations may also include determining a handover to a handover target base station. A second X2AP handover request message can be transmitted to the handover target base station, the second X2AP handover request message indicating a handover state. A second a second X2AP handover acknowledge message can be received from the handover target base station. A second RRC reconfiguration message can be transmitted to the UE.

Certain implementations are directed to systems, apparatuses, and methods performed at a neighboring base station of a wireless communications network. An X2AP handover request message can be received from a serving base station, the serving base station serving a user equipment (UE), the X2AP handover request message indicating an intermediate handover state. Admission control can be performed to evaluate if the UE can be supported. Responsive to the performing, a handover request acknowledgement message can be transmitted to the serving base station, the handover request acknowledgement message including a radio resource control (RRC) reconfiguration message.

In certain implementations, the handover request acknowledgement message includes one or more of a cell radio network temporary identifier, a security algorithm identifier, or a random access channel preamble.

In certain implementations, the handover request acknowledgement message includes an intermediate handover state acceptance indicator.

In certain implementations, the handover request acknowledgement message includes an indicator of whether the uplink synchronization with the UE is to be performed.

Certain implementations may also include receiving a data packet destined for the UE from the serving base station and transmitting the data packet to the UE.

Certain implementations may also include receiving a radio resource control (RRC) reconfiguration message from the UE, the RRC reconfiguration message including a cell radio network temporary identifier of the neighboring cell.

Certain implementations may also include terminating the intermediate handover state in response to the expiration of an intermediate handover state timer.

Certain implementations may also include transmitting a message to the serving base station indicating that the neighboring base station will transmit data to the UE.

Certain implementations may also include transmitting a message to the UE indicating that the neighboring cell will serve the UE.

Certain implementations may include receiving uplink data from the UE and transmitting the uplink data to the serving base station.

In certain implementations, the neighboring base station is an anchor base station of the IHO state.

Certain implementations may include transmitting an X2AP IHO anchor functionality transfer request message to a target base station. An RRC reconfiguration message can be transmitted to the UE, the RRC reconfiguration message including IHO anchor transfer parameters. An RRC reconfiguration acknowledge message can be received from the UE. An X2AP IHO anchor functionality transfer response message can be received from the target base station.

In certain implementations, the target base station is the serving base station.

Certain implementations may include transmitting another X2AP IHO anchor functionality transfer request message to the serving base station.

In certain implementations, the target base station is another neighboring base station.

Certain implementations may also include receiving a second X2AP handover request message, the second X2AP handover request message indicating a handover state. A second X2AP handover acknowledge message can be transmitted. An RRC reconfiguration complete message can be received from the UE.

Certain aspects are directed to systems, apparatuses, and methods performed at a UE in communication with a serving base station of a wireless communications network. A communications signal may be received from a neighboring base station, the neighboring base station neighboring the serving base station. A first measurement report may be transmitted to the serving base station, the first measurement report including a quality of service indicator of the communications signal from the neighboring base station. A radio resource control (RRC) reconfiguration message may be received from the serving base station, the RRC reconfiguration message including configuration information for communicating with the neighboring base station. Data packets may be received from the neighboring base station. A second measurement report may be transmitted to the serving base station after receiving the data packets from the neighboring base station.

Certain implementations may include transmitting an RRC reconfiguration completion message to the neighboring base station.

Certain aspects of the implementations may also include receiving a RRC reconfiguration message from an anchor base station, the RRC reconfiguration message including IHO anchor functionality transfer parameters, wherein the IHO anchor functionality is transferred to a target base station and transmitting a RRC reconfiguration acknowledge message to the anchor base station.

Certain aspects of the implementations may also include determining a handover to a handover target base station and transmitting a RRC reconfiguration complete message to the handover target base station.

Certain aspects of the implementations may also include undergoing uplink synchronization with the neighboring base station.

Certain aspects of the implementations may also include transmitting uplink data to the neighboring cell.

Certain aspects of the disclosure are directed to a base station in a wireless communications network. The base station configured to receive an indication that a user equipment (UE) is receiving coverage signal from a second base station. The base station may also forward information destined for the UE to the second base station. A communications link can be maintained with the UE after forwarding the information to the second base station.

In certain implementations, the indication is a quality of service indicator.

In certain implementations, the coverage signal includes one or more of: a reference signal, a system information broadcast signal, or a data transmission signal transmitted by a base station.

Certain aspects of the implementations also include receiving a data packet destined to an Evolved Packet Core (EPC) from the second base station. A communications link can be maintained with the UE after receiving the data packet from the second base station.

In certain implementations, forwarding the data packet may also include receiving the data packet from the second base station. The data packet can be decrypted to form Packet Data Convergence Protocol (PDCP) Service Data Unit (SDU). The encrypted data packet can be forwarded to the EPC.

In certain implementations, forwarding the information may also include receiving a data packet from an EPC, encrypting the data packet to form PDCP PDU, and forwarding the encrypted data packet to the second base station.

In certain implementations, forwarding the information destined for the UE to the second base station is performed across one or more of an X2 interface or an S1 interface.

In certain implementations, maintaining the communication link with the UE comprises maintaining RRC_connected state with the UE.

In certain implementations, maintaining the RRC_connected state with the UE includes reserving a C-RNTI assigned for the UE.

Certain aspects of the implementations may also include receiving an indication that the coverage signal from the second base station is stronger than a coverage signal from the base station, handing over control of communications for the UE to the second base station, and terminating the communications link with the UE.

In certain implementations, the indication is a quality of service indicator.

FIG. 1 is schematic representation of an example heterogeneous wireless communication network 100. The term "heterogeneous wireless communication network" or "heterogeneous network" may also be referred to as a "Hetnet." The illustrated heterogeneous network 100 includes a core network 110 and a macro cell or overlay cell 120. The term "cell" or "wireless cell" generally refers to an area of coverage of wireless transmission by a network or network component, such as an access node. The core network 110 can be connected to the Internet 160. In the illustrated implementation, the macro cell 120 can include at least one base station. The term "base station" can be interchangeably used with a network node, an access node, or a network component. Two or more base stations may operate on the same radio frequency or on different radio frequencies. In this disclosure, the term "base station" is sometimes interchangeably used with the term "cell," where the base station provides the coverage of wireless transmission of the cell.

The base station can be an overlay access node 121 connected to the core network 110 via a backhaul link 111a, including optical fiber or cable. The term "overlay access node" generally refers to a network element or component that at least partly serves to form a wireless cell. In one implementation in which the network 100 is an LTE network, the overlay access node 121 can be a Universal Terrestrial Radio Access Network (UTRAN) node B or "eNB" which is part of an evolved Universal Terrestrial Radio Access Network (E-UTRAN). An eNB that forms an overlay access node of a macro cell can be generally referred to as a "macro eNB." The term "eNB" may be interchangeably used with an "evolved node B." The eNBs may cooperate to conduct a handover procedure for User Equipment (UE) in the network 100. To conduct the handover procedure, the eNBs may exchange control information via the backhaul link 111a or 111b or 111c or 111d.

The network 100 can also include one or more underlay cells, for example, a pico cell 130 and a femto cell 140. The underlay cells can have a coverage at least partially overlapping with the coverage of the macro cell 120. While the term "underlay cell" is described herein in the context of the long term evolution (LTE) standard, other wireless standards can also have components similar to underlay cells. The implementations described herein can be adapted for such standards without departing from the scope of this disclosure. Although FIG. 1 illustrates only one pico cell and only one femto cell, the network 100 can include more or less cells. The underlay cells 130, 140 have a smaller coverage than the overlay cell 120. For example, in a suburban environment, the overlay cell 120 may have a coverage radius of 0.5 kilometer, while the underlay cells 130, 140 may have a coverage radius of 0.2 kilometer. Access nodes 131, 141 forming the underlay cells 130, 140 can use a lower transmission power than that of the overlay access node 121. The underlay cells 130, 140 may further include a range expansion area used for increasing the coverage area for the cells having a smaller coverage.

The pico cell 130 can include a pico eNB 131 connected to the core network 110 via a backhaul link 111b and to the macro eNB 121 via a backhaul link 111c. The backhaul links 111b and 111c may include cable, fiber, wireless links, or others. In some implementations, the pico eNB 131 can have a transmission power that is, for example, about 30 dBm, which is about 13 dB lower than that of the macro eNB 121.

The femto cell 140 can include a femto eNB 141 connected to the core network 110 via the Internet 160 via a wired or wireless connection. The term "femto eNB" can also be referred to as a "home eNB (HeNB)." The femto cell 140 is a subscription based cell. Three access modes can be defined for HeNBs: closed access mode, hybrid access mode and open access mode. In closed access mode, HeNB provides services only to its associated closed subscription group (CSG) members. The term "closed subscription group (CSG)" can be interchangeably used with closed subscriber group. Hybrid access mode allows HeNB to provide services to its associated CSG members and to non-CSG members. In some implementations, the CSG members are prioritized to non-CSG members. An open access mode HeNB appears as a normal eNB.

The network 100 can also include a relay node 150 which serves to wirelessly relay data and/or control information between the macro eNB 121 and user equipment 170. The macro eNB 121 and the relay node 150 can be connected to each other via a wireless backhaul link 111d. In such an instance, the macro eNB 121 can be referred to as a donor eNB. In some implementations, the relay node 150 can have a transmission power that is, for example, about 30 or 37 dBm, which is about 13 dB or 6 dB lower than that of the macro eNB 121. The term "underlay access node" generally refers to pico eNBs, femto eNBs, or relay nodes.

The user equipment 170 can communicate wirelessly with any one of the overlay access nodes 121 or the underlay access nodes 131, 141, 150, depending on the location or the existence of subscription in the case of the femto cell 140. The term "user equipment" ("UE") can refer to various devices with telecommunications capabilities, such as mobile devices and network appliances. The UE 170 may switch from the coverage of one cell to another cell, for example, from the coverage of the pico cell 130 to the coverage of the macro cell 120, i.e., a pico-to-macro cell change, or from the coverage of a macro cell 120 to the coverage of the pico cell 130, i.e., a macro-to-pico cell change. A handover procedure may be conducted to ensure that the UE does not lose connection with the network while switching between cells.

Examples of user equipment include, but are not limited to, a mobile phone, a smart phone, a telephone, a television, a remote controller, a set-top box, a computer monitor, a computer (including a tablet computer such as BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game device, etc. The UE 170 may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. In some implementations, the UE 170 may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 2:
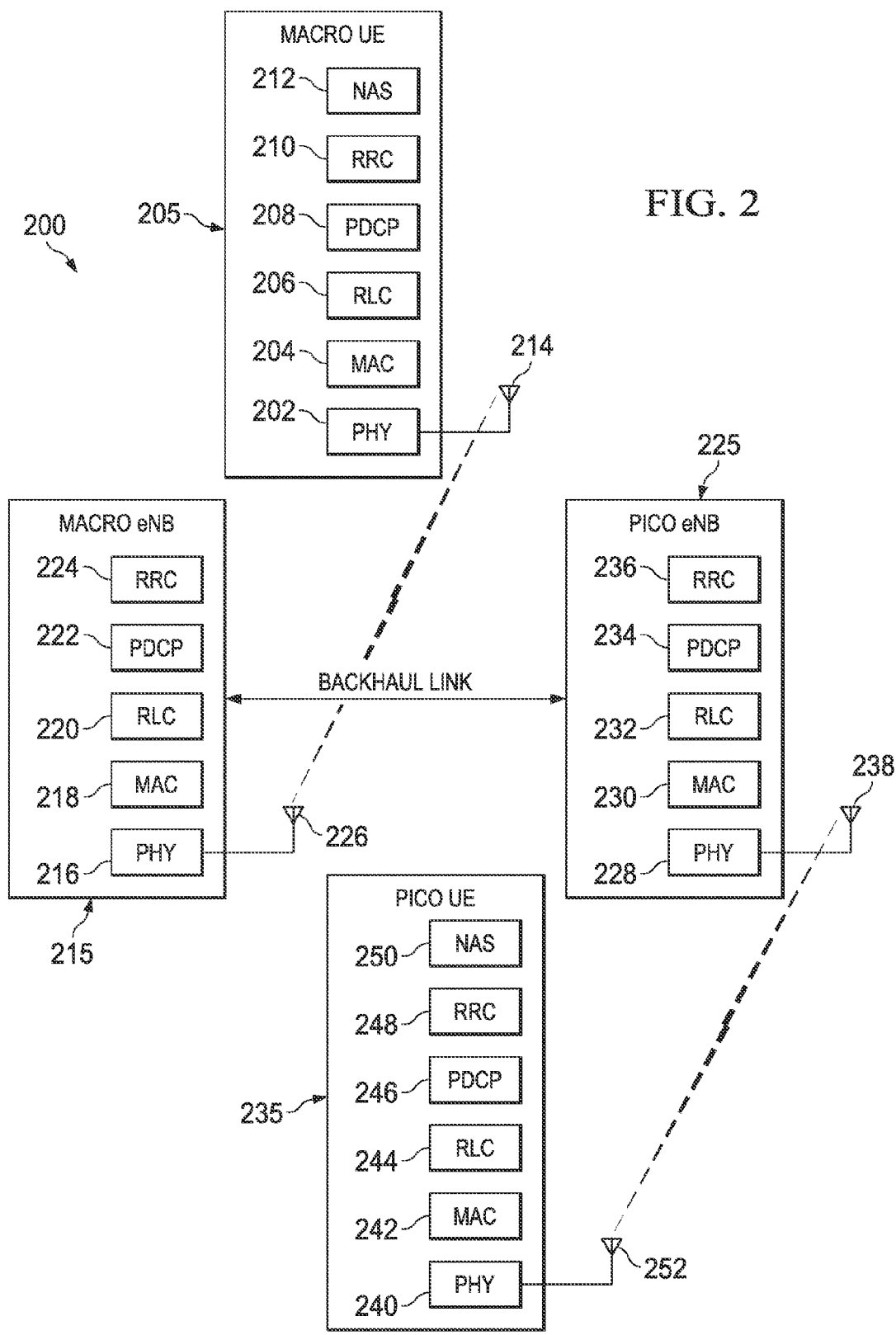
FIG. 2 is a schematic block diagram illustrating various layers of access nodes and user equipment in a wireless communication network.

FIG. 2 is a schematic block diagram 200 illustrating various layers of access nodes and user equipment in an example wireless communication network. The illustrated system 200 includes a macro eNB 215, a pico eNB 225, a macro UE 205, and a pico UE 235. Here macro UE 205 and Pico UE 235 are UEs which are either actively communicating or camping on macro eNB 215 and pico eNB 225 respectively. The macro eNB 215 and the pico eNB 225 can be collectively referred to as a "network," "network components," "network elements," "access nodes," or "access devices." FIG. 2 shows only these four devices (also referred to as "apparatuses" or "entities") for illustrative purposes, and the system 200 can further include one or more of these devices without departing from the scope of this disclosure.

The macro eNB 215 can communicate wirelessly with the macro UE 205. The pico eNB 225 can communicate wirelessly with the pico UE 235. The macro eNB 215 can communicate with the pico eNB 225 via a backhaul link, for example, an X2 backhaul link, a wireless connection, or a combination thereof. In some implementations, the macro eNB 215 and pico eNB 225 may exchange handover control information via the backhaul link.

Each of the devices 205, 215, 225 and 235 includes a protocol stack for communications with other devices via wireless or wired connection. The macro eNB 215 can include a physical (PHY) layer 216, a medium access control (MAC) layer 218, a radio link control (RLC) layer 220, a packet data convergence protocol (PDCP) layer 222, and a radio resource control (RRC) layer 224. In the case of user plane communications for data traffic, RRC layer is not involved. The macro eNB 215 can also include one or more transmit and receive antennas 226 coupled to the PHY layer 216. In the illustrated implementation, a "PHY layer" can also be referred to as "layer 1 (L1)." A MAC layer can also be referred to as "layer 2 (L2)." The other layers (RLC layer, PDCP layer, RRC layer and above) can be collectively referred to as a "higher layer(s)."

Similarly, the pico eNB 225 includes a PHY layer 228, a MAC layer 230, a RLC layer 232, a PDCP layer 234, and an RRC layer 236. The pico eNB 225 can also include one or more antennas 238 coupled to the PHY layer 228.

The macro UE 205 can include a PHY layer 202, a MAC layer 204, a RLC layer 206, a PDCP layer 208, an RRC layer 210, and a non-access stratum (NAS) layer 212. The macro UE 205 can also include one or more transmit and receive antennas 214 coupled to the PHY layer 202. Similarly, the pico UE 235 can include a PHY layer 240, a MAC layer 242, a RLC layer 244, a PDCP layer 246, an RRC layer 248, and a NAS layer 250. The pico UE 235 can also include one or more transmit and receive antennas 252 coupled to the PHY layer 240.

Communications between the devices, such as between the macro eNB 215 and the macro UE 205, generally occur within the same protocol layer between the two devices. Thus, for example, communications from the RRC layer 224 at the macro eNB 215 travel through the PDCP layer 222, the RLC layer 220, the MAC layer 218, and the PHY layer 216, and are sent over the PHY layer 216 and the antenna 226 to the macro UE 205. When received at the antenna 214 of the macro UE 205, the communications travel through the PHY layer 202, the MAC layer 204, the RLC layer 206, the PDCP layer 208 to the RRC layer 210 of the macro UE 205. Such communications are generally done utilizing a communications sub-system and a processor, as described in more detail below.

Some typical functionality of different protocol layers is briefly described below. The NAS protocol, which runs between a core network and the UE, can serve for control purposes such as authentication, session management, and UE mobility management. The RRC layer in the eNB may be capable to make handover decisions based on neighbor cell measurements sent by the UE, broadcasts system information, controls UE measurement and allocate cell-level temporary identifiers to active UEs. The functionality of PDCP layer includes, among other things, encryption of user data stream and header compression and decompression. The RLC layer can be used to format and transport traffic between the UE and the eNB. The MAC layer is responsible for, among other things, control of random access procedure, scheduling of data packets, and mapping of logical channels to transport channels. The PHY layer may involve modulation and demodulation, error protection of data package by utilizing coding, radio frequency (RF) processing, radio characteristics measurements and indications to higher layers, and support for multiple input multiple output (MIMO) if multiple antennas are equipped with the eNB or the UE.

In the implementations described in this disclosure, various steps and actions of the macro eNB, macro UE, pico eNB, and pico UE can be performed by one or more of the layers described above in connection with FIG. 2. For example, handover procedure for the macro UE 205 can be performed by one or more of the layers 202-212 of the macro UE 205. Handover procedure by the pico UE 235 can be performed by one or more of the layers 240-250 of the pico UE 235. Channel quality measurement may be performed by the PHY layer and MAC layer of the macro UE 205 and pico UE 235. For another example, handover of UE may be initiated by the RRC layer 224 of the macro eNB 215 and the RRC layer 236 of the pico eNB 225.

Figure 3:
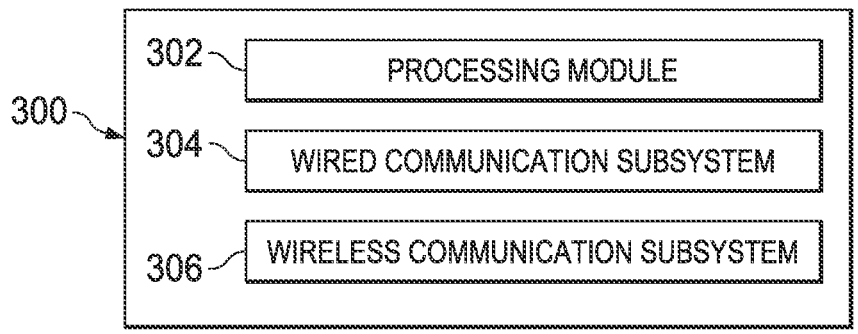
FIG. 3 is a schematic block diagram illustrating an access node device.

FIG. 3 is a schematic block diagram 300 illustrating an access node device. The illustrated device 300 includes a processing module 302, a wired communication subsystem 304, and a wireless communication subsystem 306. The wireless communication subsystem 306 can receive data traffic and control traffic from the UE. The wired communication subsystem 304 can be configured to transmit and receive control information between other access node devices via backhaul connections. The processing module 302 can include one or more processing components (also referred to as "processors" or "central processing units" (CPUs)) capable of executing instructions related to one or more of the processes, steps, or actions described above in connection with one or more of the implementations disclosed herein. The processing module 302 can also include other auxiliary components, such as random access memory (RAM), read only memory (ROM), secondary storage (for example, a hard disk drive or flash memory). The processing module 302 can form at least part of the layers described above in connection with FIG. 2. In particular, the processing module 302 may be configured to receive signal quality indicators from the UE. The processing module 302 may also be configured to determine a handover or an intermediate handover based on the received signal quality indicators, and to transmit a handover or an intermediate handover command. The processing module 302 can execute certain instructions and commands to provide wireless or wired communication, using the wired communication subsystem 304 or a wireless communication subsystem 306. A skilled artisan will readily appreciate that various other components can also be included in the device 300.

Figure 4:
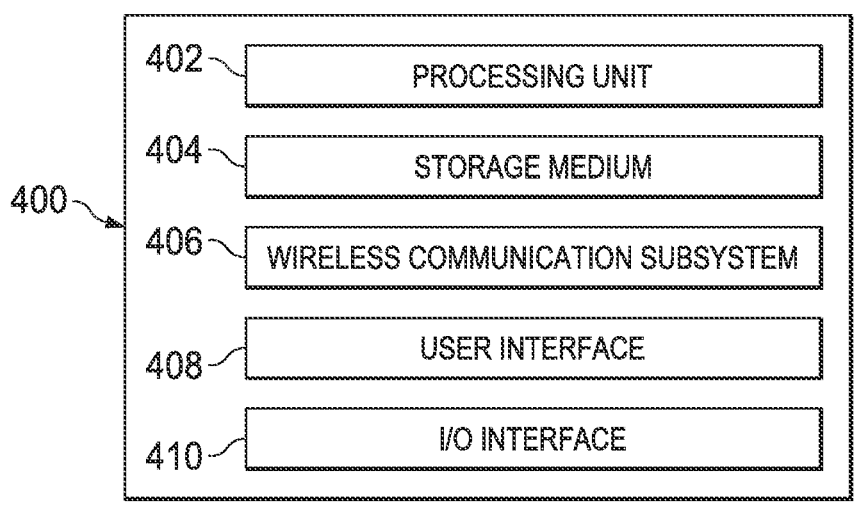
FIG. 4 is a schematic block diagram illustrating a user equipment device.

FIG. 4 is a schematic block diagram 400 illustrating user equipment device. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include one or more processing components (also referred to as "processors" or "central processing units" (CPUs)) configured to execute instructions related to one or more of the processes, steps, or actions described above in connection with one or more of the implementations disclosed herein. In particular, the processing module 402 may be configured to estimate signal quality associated different cell and transmit signal quality indicators to an access node. The processing module 402 may also be configured to receive signaling from access nodes and perform operations accordingly, such as transitions between a handover state and an intermediate handover state. The processing module 402 can form at least part of the layers described above in connection with FIG. 2. The processing unit 402 can also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and a digital signal processing (DSP) unit. In some implementations, the subsystem 406 can support multiple input multiple output (MIMO) transmissions.

The user interface 408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 410 can include, for example, a universal serial bus (USB) interface. A skilled artisan will readily appreciate that various other components can also be included in the device 400.

Figure 5:
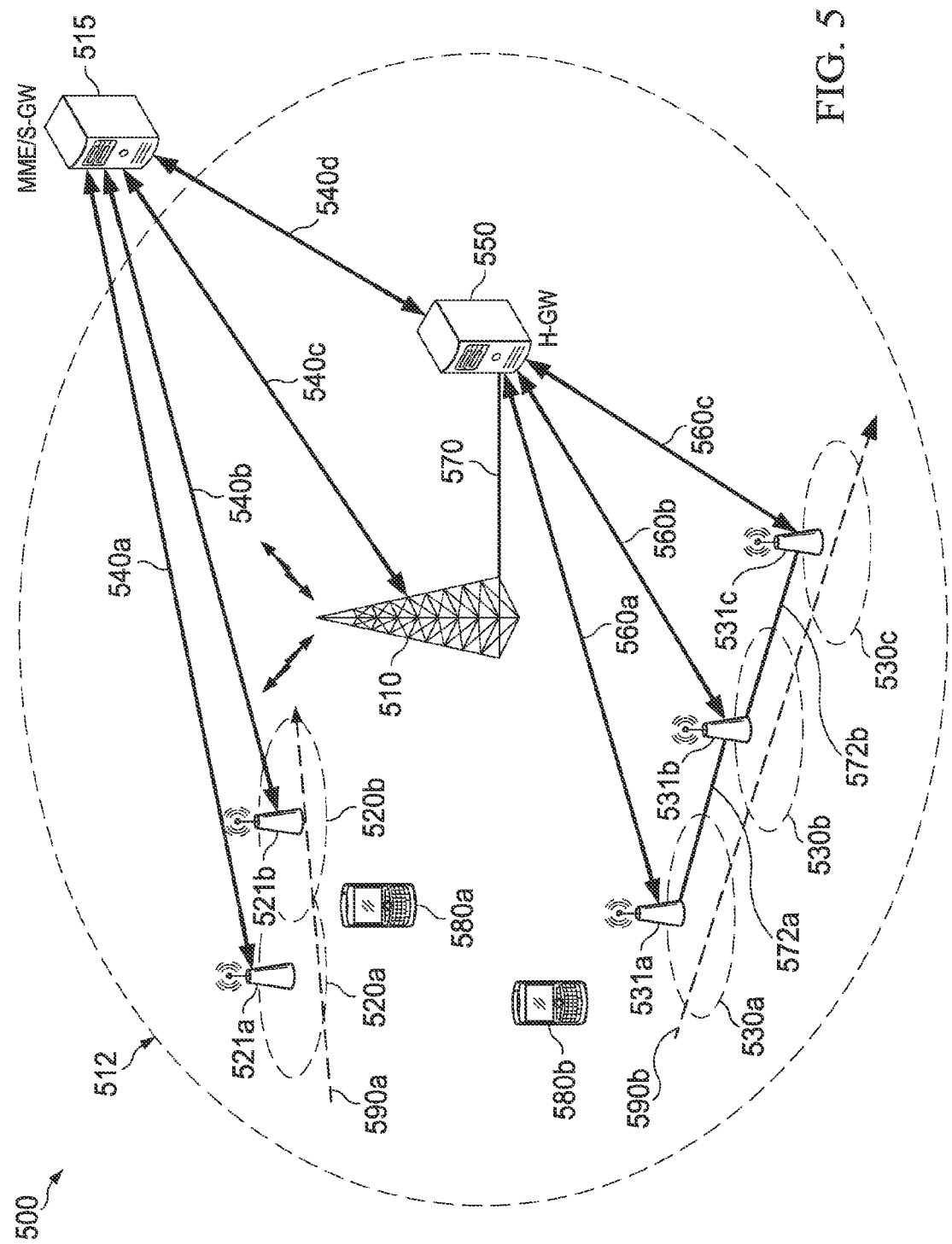
FIG. 5 is a schematic presentation of an example deployment of a heterogeneous network.

FIG. 5 is a schematic presentation 500 of an example deployment of a heterogeneous network. As shown in FIG. 5, a macro eNB 510 provides a macro coverage area 512. Pico cells 520a and 520b and a femto cell cluster 530a-c may be situated within the coverage of a macro cell 512. The pico cell eNBs 521a and 521b and macro cells eNB 510 are connected to EPC (Evolved Packet Core) network through the MME (Mobility Management Entity)/S-GW (Serving Gateway) 515 via backhaul connections 540a-c. The backhaul connection can be, for example, an S1 interface. Femto cell eNBs (HeNBs) 531a-c are connected to an intermediate gateway HeNB-GW 550 through backhaul links 560a-c such as S1 interfaces. The HeNB-GW 550 can be connected with the MME/S-GW 515 via an S1 interface 540d as well. Backhaul connections may exist between different types of eNBs. For example, the macro eNB 510 and the pico eNBs 521a-b can be connected through an X2 interference (not shown). The femto eNBs 531a-c may be connected with each other via the X2 interface 572a-b. Moreover, an X2 interference 570 can be also introduced between the macro eNB 510 and HeNB-GW 550 in order to facilitate communications and coordination between the macro cell 512 and the femto cells 531a-c and provide seamless service coverage for UEs in this area.

When a UE moves around in the area of 512, it may traverse different cells and trigger multiple handovers. In one example, a UE 580a may move along a trajectory 590a where it starts from the pico cell 520a, gets exposed to the coverage area of the macro cell 512 when it arrives at cell edge of the pico cell 520a, and then enters another pico cell 520b. During this trajectory, two handovers may occur: a first one from the pico cell 520a to the macro cell 512 and a second one from macro cell 512 to the next pico cell 520b. In another example, if UE 580b moves along a trajectory 490b, similarly, there can be multiple handovers between the macro cell 512 and the femto cells 530a-c. Frequent handovers between multiple cells can result in increases of signalling overhead and delay, prolonged data interruptions, and degradation of the QoS of UEs.

In heterogeneous communication networks, especially under a small cell cluster deployment as shown in FIG. 5, large overlaps in coverage between macro and femto/pico cells are generally expected. Cell boundaries between the macro and femto/pico cells can have acceptable coverage for control signaling receipt. Furthermore, some type of interference cancellation and/or coordination methods is generally used in this type of deployments. Therefore a UE may receive control signaling from multiple cells and collaborate with multiple cells for handover operations accordingly. The UE may maintain downlink (DL) and uplink (UL) transmissions synchronization within the cluster deployment. The UE may control its transmit power and timing on the uplink based on the receive point at any given time. In an alternate embodiment, the UE may be capable of maintaining separate UL and DL synchronization with the multiple neighboring cells within an acceptable range simultaneously.

To restrict the handover and reduce unnecessary and unwanted data interruptions, an intermediate handover (IHO) state can be introduced. With an enablement of the IHO state, the number of handovers can be reduced to one for both trajectories 590a-b mentioned above. For example, for the trajectory 590a where the UE 580a is traversing between the pico cells 520a and 520b, the handover to/from macro cell 512 can be avoided by keeping the UE 580a to the pico cell 520a until the UE 580a completely enters the coverage area of pico cell 520b. Then, the UE 580a can only be handed over once from the pico cell 520a to the pico cell 520b. Implementations of the IHO state will be described in further details below.

Figure 6A:
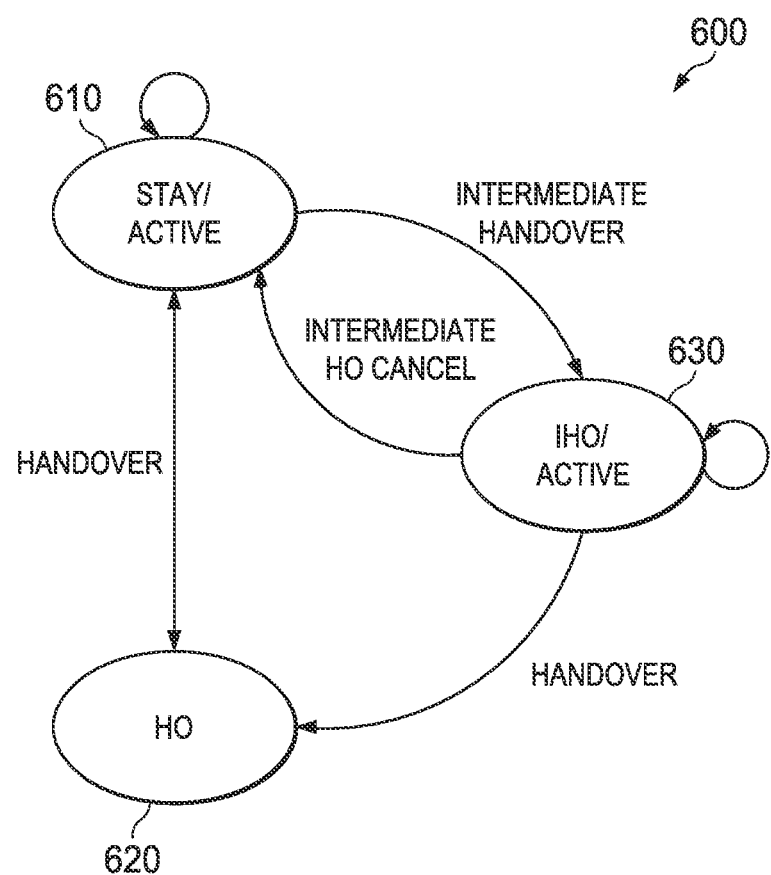
FIG. 6a is a schematic state diagram illustrating a handover mechanism involving an intermediate handover (IHO) state.

FIG. 6a is a schematic state diagram 600 illustrating a handover mechanism involving the IHO state. In general, when a UE is registered with a serving cell, it has RRC (Radio Resource Control) connection with the serving cell and can actively communicate with the core network. A UE in "STAY/ACTIVE" 610 is in RRC_ACTIVE state with the serving cell and can transmit and receive, for example, Packet Data Control Protocol (PDCP) packets, from the serving eNB. The UE may send a signal quality indicator to the serving base station. The signal quality indicator can be a measurement feedback, such as Channel Quality Information (CQI) reports of a target cell. The serving cell may send an RRC message so that the UE may transition to "HO" state 620 or "IHO" state 630 based on the measurement reports from the UE. From the "IHO" state 630, the UE may transition back to RRC_ACTIVE state 610 with the serving cell or to a "HO" state. This transition may happen at the request of the serving cell or can be triggered autonomously. Once the HO is performed the UE goes into "STAY/ACTIVE" state with a target cell.

In the IHO state 630, the UE is not handed over to any of the target cells completely. These target cells are referred to as IHO candidate cells during the IHO state. An example method to select IHO candidate cells will be discussed in further details below. The PDCP packets from the serving eNB are routed to the IHO candidate eNB(s) over a backhaul link, such as the X2 interface, which connects eNBs. If the QoS of a candidate cell is expected to be better than that of the serving cell, the PDCP packets are scheduled and transmitted by that candidate cell to the UE. Recall that the PDCP processing can provide encryption of the data packets for security and identity protection. During the IHO state, the encryption of the data packets may remain unchanged and still be conducted by the serving cell. Therefore, the data rerouting from the serving cell to the candidate cell is completely transparent to the EPC network. Moreover, most control signaling of the RRC and NAS may also originate from the serving eNB and be rerouted to the candidate eNB(s), for example, through backhaul links. Therefore, the IHO state in this disclosure can also be referred as a network agnostic mobility management (NA-MM) state, which means the state is transparent to the core network. When the expected QoS difference with respect to serving cell and IHO candidate cell is larger than a threshold, the UE may be instructed to handover completely to one of the candidate cells (i.e. exits the intermediate handover state).

In the intermediate handover state, the UE may transmit/receive packets to/from either the target cell or the serving cell. The cell which actively transmits the data to the UE is referred to as the Anchor cell. The switching of transmission/receipt between the cells may be decided by the Anchor cell. The packet transmission/receipt cell may be indicated in an RRC message transmitted by the anchor cell.

Normally the switching of anchor cell can occur at the start of a new IP packet/PDCP SDU transmission. For DL, the anchor eNB is aware of the transmission of a new PDCP SDU. In the case of UL, UE may be aware of this condition and inform the completion of the IP packet/PDCP SDU so that new resources are assigned by the new anchor cell. The IP packet segmentation is done independently at each candidate cell. Normally the switching between the candidate cells is not expected to be very frequent. The switching times are typically dependent on the application type. For example, for Gaming applications, the IP packets tend to be small. In this case the switching between the cells may be faster (if the signal quality with respect to each cell varies very rapidly).

The IHO state may be time limited. Because each candidate cell participating in the IHO state may reserve resource for the UE, configuring a timer associate with the IHO state can avoid excessive system resource reserved for one UE whereas qualify of service of other UEs in the network may be affected. The value of the timer $T_{IHO}$ can be implementation specific, for example, depending on a deployment scenario. The network operator can have the freedom to configure the time limit for the IHO state to optimize the system performance. In some implementations, the serving eNB may send the value of the timer to the candidate cells during the IHO request.

The system operator can determine under what scenarios the IHO state can be enabled. For example, it might be set that IHO state can be only enabled if one or more of the neighboring cells are low power cells, i.e. pico/femto/relay cells/nodes. The IHO state may be enabled or disabled by the operator through OAM (Operations, Administration, and Maintenance) settings.

Figure 6B:
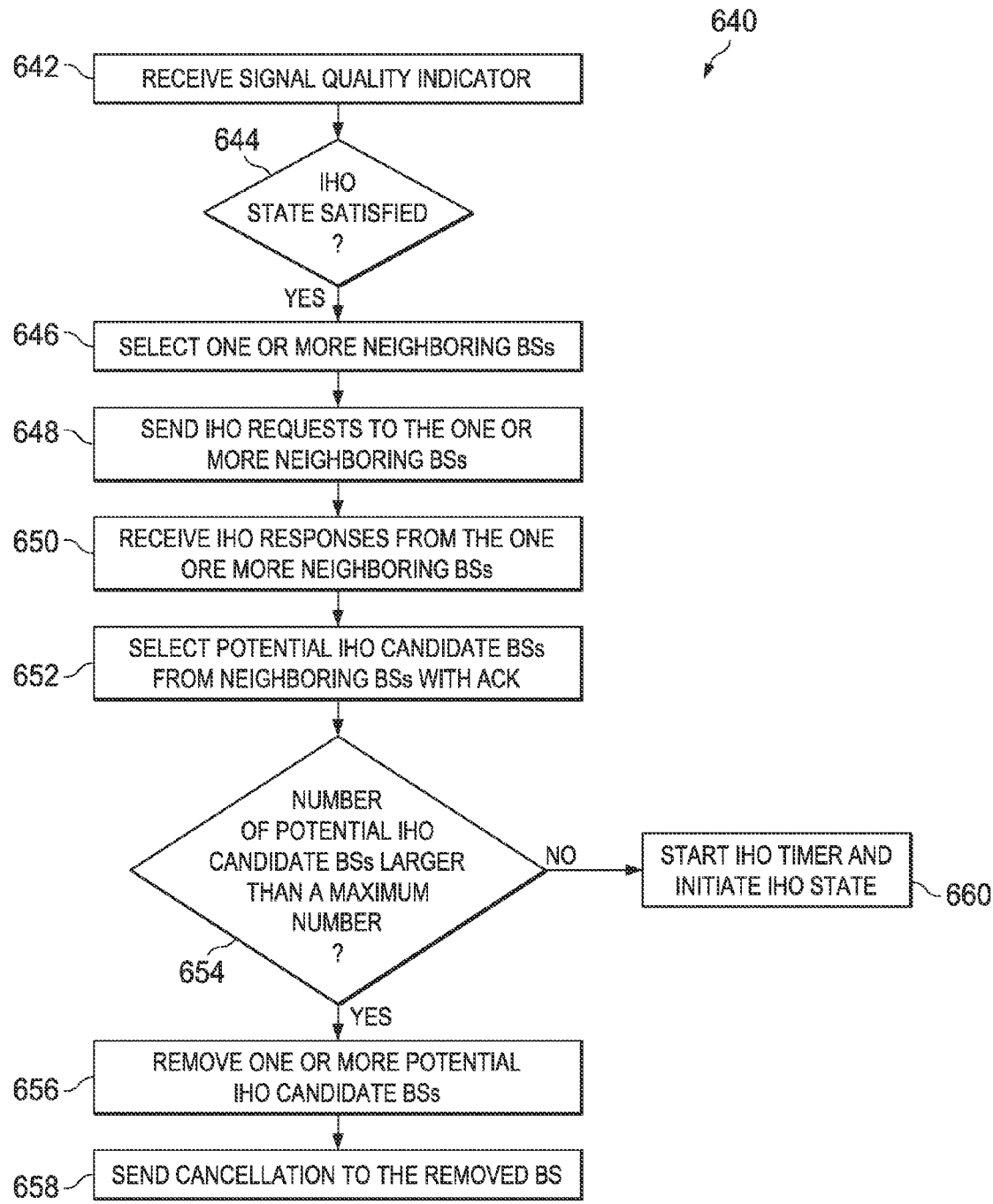
FIG. 6b is a schematic flow chart illustrating a method may be performed by a serving cell for IHO candidate cell selection.

FIG. 6b is a schematic flow chart 640 illustrating a method may be performed by a serving cell of a UE for IHO candidate cell selection. In a heterogeneous network, a UE may receive and measure downlink (DL) signal quality with respect to the serving cell, as well as a plurality of neighboring cells. A neighboring cell can be, for example, a macro cell, a pico cell, or a femto cell. The UE may send a DL signal quality indicator to the serving cell. The DL signal indicator may indicate the serving cell that the UE is proximate to one or more neighboring base stations and can receive data packets from the neighboring base stations. In some implementations, the DL signal indicator can be signal quality measurement feedback, such as Channel Quality Information (CQI) reports of the neighboring cells, or any other channel quality parameters. For example, the receive signal quality can include at least one of the following:

reference signal receive quality, reference signal receive power, signal to interference plus noise ratio, or average packet delay.

Upon the receipt of the signal quality indicator at step 642, the serving cell may determine whether a condition for an IHO state is satisfied based on the signal quality indicator from the UE at step 644. Given the condition satisfied, in step 646, the serving cell may select one or more neighboring base stations whose DL signal quality report is above a predefined threshold. The predefined threshold can be a UE specific parameter and selected to guarantee the promised Quality of Service (QoS) to the UE. Then, at step 648, the serving cell can send IHO request messages to the one or more neighboring base stations. The neighboring base stations can determine whether to participate in the IHO state based on several factors, such as, whether the base station has enough resource to allocate to the UE, and/or whether the UE is a subscription group (CSG) member if neighboring base station is a HeNB with closed access or hybrid access mode.

If a neighboring base station agrees to join the IHO state, it may reserve DL resource for the UE. The neighboring base stations may inform the serving cell their respective decisions via the IHO responses. After receiving the IHO responses from the neighboring cells in step 650, the serving cell can further select one or more potential IHO candidate base stations in step 652 out of the neighboring base stations that respond positively to the IHO request. Thus a group of potential IHO candidate base stations is formed.

In some implementations, the serving base station may compare the number of potential IHO candidate base stations with a maximum allowed number of IHO candidate base stations in step 654. The maximum allowed number can be a network configuration dependent parameter and be set by the network operator. If the number of potential IHO candidate base stations is above the maximum allowed number of IHO candidate base stations, the serving base station may remove one or more base stations from the group of potential IHO candidate base stations in step 656 and send cancellation messages to those base stations in step 658. If the number of potential IHO candidate base stations does not exceed the maximum allowed number of IHO candidate base stations, the base station can start an IHO timer and send a control information to the UE to initiate the IHO state. In some implementations, the control information can be sent via a radio resource control (RRC) message.

During the IHO state, the UE can be connected to the serving cell as well as at least one candidate target cell. Enabling the RRC_ACTIVE state with both the eNBs may require some changes to the existing standards. As illustrated in FIG. 5, depending on system deployment, in some embodiments, pico/femto cells (e.g., pico cells 520a and 520b) can be directly connected to the network and have an X2 interface with other eNBs; in other embodiments, femto cells (e.g., femto cells 530a-c) can be connected to the network via H-GW and H-GW and eNB are connected over an X2 interface. Proper protocol and signaling changes can be made to incorporate IHO state in handover procedures under different system deployments.

Figure 7:
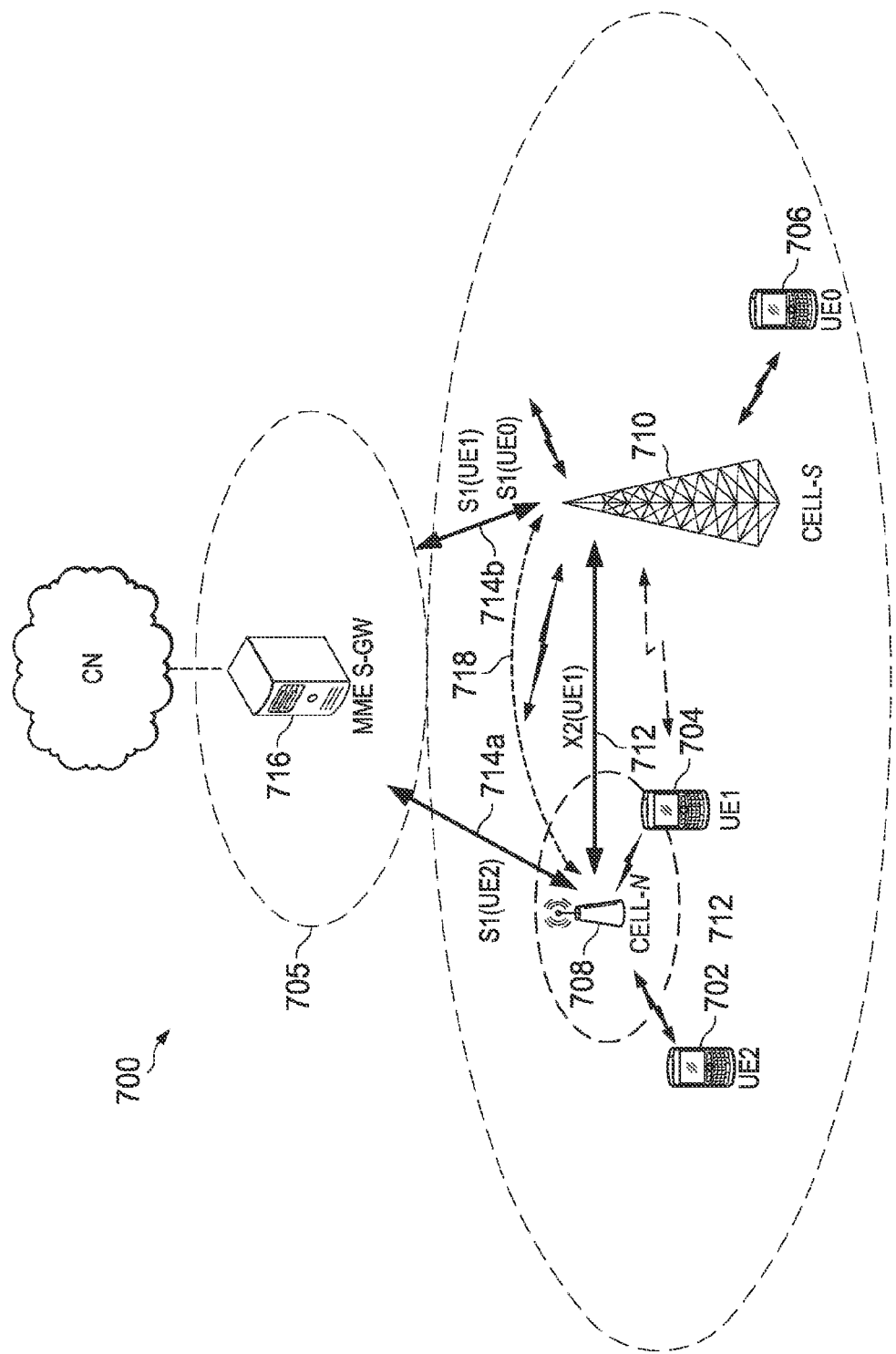
FIG. 7 is a schematic illustrating an example deployment of a heterogeneous network.

FIG. 7 is a schematic 700 illustrating an example heterogeneous network where pico or femto cells are directly connected to the core network and having an X2 interface with other eNBs. As shown in FIG. 7, three UEs, UE0 702, UE1 704 and UE2 706, are connected to the EPC 705 via a pico cell (Cell-N) 708 and a macro cell (Cell-S) 710. Cell-S 710 is the serving cell (a first cell) of the UE1 704. In some implementations, the UE1 704 may receive coverage signal from a second cell, say, Cell-N 708 when UE1 704 is in the common coverage of both cells. The coverage signal can include one or more of a reference signal, a system information broadcast signal, or a data transmission signal transmitted by a base station. The UE may send a signal quality indicator to the serving cell. The signal quality indicator may represent the quality of the received signal at the UE from the serving cell and the second cell Cell-N 708. Some example signal quality indicator can be RSRP (Reference Signal Received Power), RSRQ (Reference Signal Received Quality), Channel Quality Information (CQI), or any other channel quality parameters. Based on the indicator from the UE, the serving base station may decide and initiate an IHO state of the UE with the serving cell and the second cell.

During the IHO state, both the serving cell Cell-S 710 and the second cell Cell-N 708 can maintain a communication link with the UE. The communication link can be, for example, a RRC connection. UE1 704 may transmit/receive data packets to/from either one of the cells. The transmission from the core network/base station to the UE is referred to as downlink (DL) transmission; and transmission from the UE to the core network/base station is referred to as uplink (DL) transmission. In the following, some example process or signaling flow are discussed in accordance with DL transmission. Corresponding process and signaling flow for UL transmission can be readily appreciated by a skilled artisan in the art.

In one example, if the UE1 704 gets a better signal quality from Cell-N 708, the Cell-S 710 can transmit the encrypted data packets (such as Packet Data Convergence Protocol (PDCP) packets) destined to the UE to the Cell-N 708 via a backhaul link (such as the X2 interface 712 in FIG. 7). Note that this data packet rerouting is not visible to the EPC 705. The encryption keys associated with the data and control signaling (including the data scrambling function) are also not affected since the data sent by the Cell-N 708 is already encrypted by Cell-S 710. As an example, the Cell-S 710 can receive a data packet from the EPC, encrypts the data packet form PDCP Service Data Unit (SDU), and forward the encrypted data packet to the second cell Cell-N 708. After transmitting the data packet to the second cell, the serving cell can still maintain a communications link with the UE during the IHO state.

In some embodiments, the IHO state can be established based on control signal exchange between the two cells via X2-C interface 712. During the IHO state, the data packets can also be exchanged over the X2-U interface.

In other embodiments, X2 may not exist between the two cells (or eNBs); the information exchange can be performed via S1 interface such as 714a-b involving the MME/SGW 716 as shown by the dotted line 718 in FIG. 7.

Note that FIG. 7 only shows an example IHO state involving a serving cell and a neighboring cell. A skilled artisan can readily appreciated that an IHO state can also involve a serving cell and a plurality of neighboring cells. Moreover, in FIG. 7, the two cells, namely, Cell-S 708 and Cell-N 710, are connected to a same MME and SGW 716. In other implementations where the cells are connected to multiple MMEs and/or S-GWs, the IHO state can also be enabled without departing from the scope of this disclosure. In such aspects of implementations, the related control information and data packets can go through, for example, backhaul links that connect the multiple MMEs and/or S-GWs.

In some implementations, the serving base station may receive an indication that the signal quality from the second base station is stronger than the signal from the serving base station such that a handover can be triggered. In this case, the serving base station can hand over control of communications for the UE to the second base station and exit the IHO state by terminating the communications link with the UE.

Figure 8A:
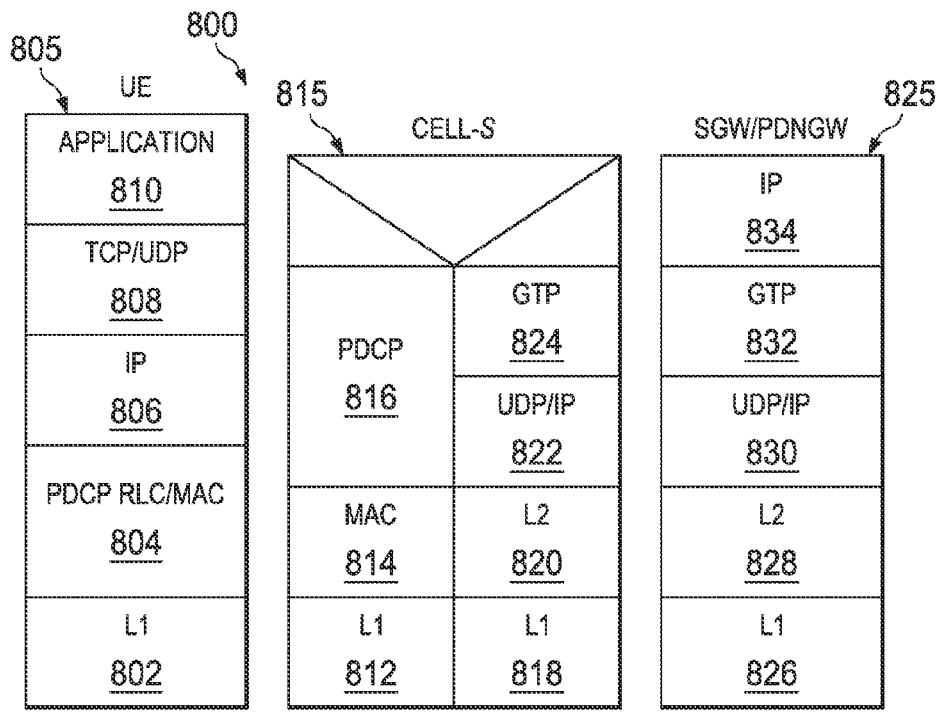
FIGS. 8a-b are schematic block diagrams illustrating example user plane protocol stacks.
Figure 8B:
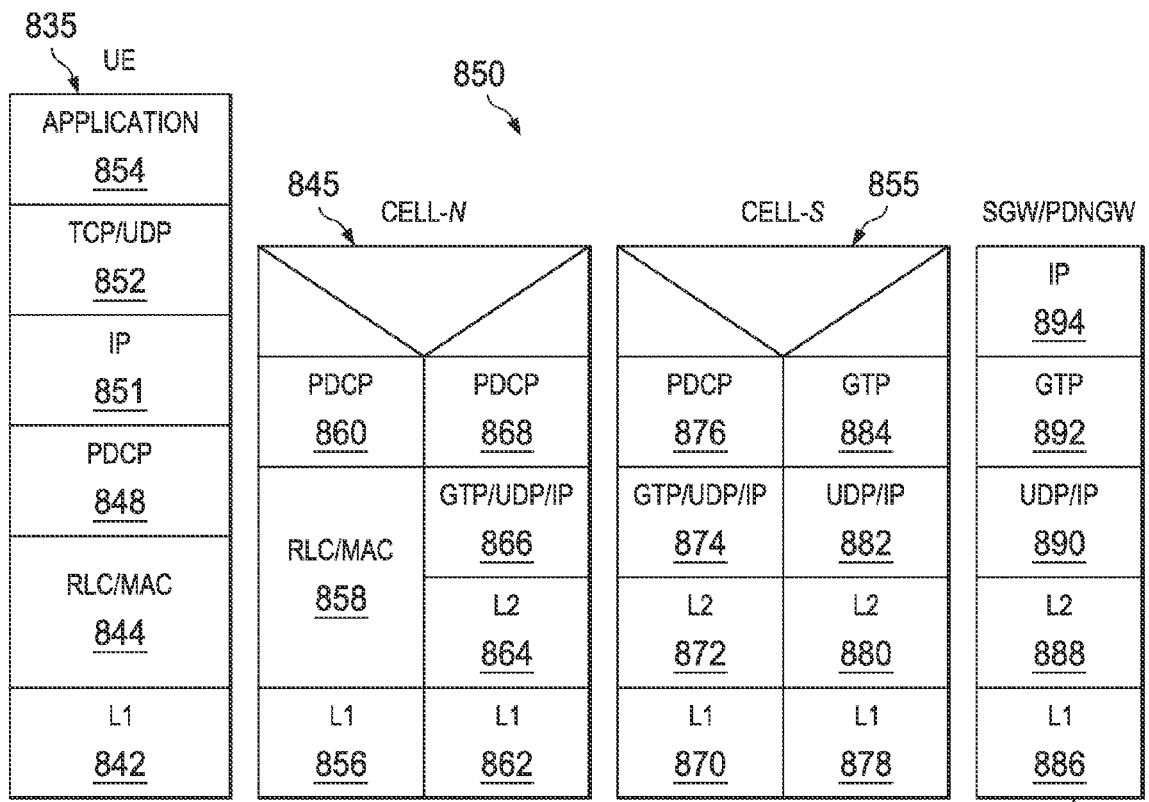

To look at the enablement of an IHO state from a protocol perspective, FIGS. 8a-8b illustrate example user plane protocol stacks of access nodes and UE during the IHO state. Wireless networks may distinguish between user plane protocol and control-plane protocol. Various examples of user-plane traffic and services carried by the user plane include voice, video, internet data, web browsing sessions, upload/download file transfer, instant messaging, e-mail, navigation services, RSS feeds, and streaming media. Control-plane traffic signaling may be used to enable or support transfer of the user plane data via the wireless network, including, for example, mobility control and radio resource control functionality. Various examples of control plane traffic include core-network mobility and attachment control, (e.g., Non-Access Stratum (NAS) signaling), radio access network control (e.g., Radio Resource Control (RRC)), and physical layer control signaling such as may be used to facilitate advanced transmission techniques and for radio link adaptation purposes.

FIG. 8a is a schematic block diagram 800 showing the user plane protocol stack when a UE 805 is communicating with its serving cell 815. The serving cell 815 is further connected to a Serving Gateway (SGW)/Packet Data Network Gateway (PGNGW) 825. The SGW can serve as a mobility anchor for the user plane during inter-eNB handovers and as the anchor for mobility between LTE and other 3GPP technologies. PGNGW can serve as the anchor for mobility between 3GPP and non-3GPP technologies such as WiMAX and 3GPP2 (e.g., CDMA 1× and EvDO).

The user plane protocol stack of UE 805 includes a L1 (Layer 1) 802, also known as a PHY layer, an upper layer 804 (including a MAC layer, a RLC layer, and a PDCP layer), an IP layer 806, a TCP/UDP layer 808 and an Application layer 810. Similarly, the serving cell 815 (e.g., the macro Cell-S 710 in FIG. 7) includes a L1 812, a MAC layer 814, a PDCP layer 818 to communicate with the UE.

On the other hand, there may be a backhaul connection such as an S1 user interface between the serving cell and the SGW/PDNGW. The serving cell 815 may include a L1 818, a L2 (Layer 2, also known as MAC layer) 820, an UDP/IP layer 822, a GPRS Tunneling Protocol (GTP) layer 824 to communicate with the SGW/PDNGW 825. Accordingly, the SGW/PDNGW 825 can have a user plane stack containing a L1 826, a L2 828, a UDP/IP layer 830, a GTP layer 832 and an IP layer 834.

The Application layer 810 of UE 805 provides end-to-end connectivity between the UE and a remote host such as another UE, or a remote internet server. For example, a navigation application may utilize TCP for file transfer of mapping data from an internet server to a device. The application, may utilize Internet-based protocols (IP) to establish an end-to-end connection.

In the illustrated example, the IP layer 834 of the SGW/PDNGW 825 may receive IP packets intended for the UE 805 from the internet server. The data packets can be transmitted between the backhaul connection (e.g., S1 user interface) between the SGW/PDNGW 825 and the serving cell 815 through the GTP layer 832, the UDP/IP layer 830, the L2 828 and the L1 826 on the SGW/PDNGW side, and the L1 818, the L2 820, the UDP/IP layer 822, and the GTP layer 824 on the serving cell side. The serving cell 815 may encrypt the data packets at the PDCP layer 816, pass the PDCP packets to the MAC layer 814, and be sent over the L1 812 to the UE 805.

The signal received at the UE 805 can be processed through the L1 802, the RLC/MAC/PDCP layer 804, the IP layer 806, the TCP/UDP layer 808, and eventually reach the Application layer 810 and complete an end-to-end communication.

FIG. 8b is a schematic block diagram 850 showing the user plane protocol stack when a UE 835 is communicating with a neighboring cell 845 (e.g., pico/femto cell Cell-N 708 in FIG. 7). In this embodiment, the neighboring cell 845 has a backhaul connection such as an X2 interface between the serving cell 855 (e.g., the macro Cell-S 710 in FIG. 7) that is further connected to a SGW/PDNGW 865. The protocol stack between the serving cell 855 and the SGW/PDNGW 865 is the same as the one between the serving cell 815 and the SGW/PDNGW 825 shown in FIG. 8a, including a GTP layer 884, a UDP/IP layer 882, a L2 880 and a L1 878 on the serving cell 855 side, and a L1 886, a L2 888, a UDP/IP layer 890, a GTP layer 892, and an IP layer 894 on the SGW/PDNGW 865 side.

In the illustrated example, since the Cell-S 855 is still the serving cell of the UE 835, the SGW/PDNGW 865 may still route data packets destined for the UE 835 to Cell-S 855. The Cell-S 855 can then send the encrypted data packets to the Cell-N 845 via the X2 interface. The user plane protocol between the Cell-S 855 and Cell-N 845 can include a PDCP layer 876, a GTP/UDP/IP layer 874, a L2 872 and a L1 870 at the Cell-S 855 and a PDCP layer 868, a GTP/UDP/IP layer 866, a L2 864 and a L1 862 at the Cell-N 845 accordingly. As mentioned above, this data packet rerouting is not visible to the EPC. The encryption keys associated with the PDCP data packets and control signalling (including the data scrambling function) are also not affected since the data sent by the Cell-N is already encrypted by Cell-S.

Between the neighboring cell 845 and the UE 835, the user plane protocol is similar to the one between the serving cell 815 and the UE 805 in FIG. 8a. For instance, the downlink user plane traffic may go through a PDCP layer 860, a RLC/MAC layer 858, and transmit over a L1 856 to the UE 835 where the received user traffic is processed through a L1 842, a RLC/MAC layer 844, a PDCP layer 848, an IP layer 851, a TCP/UDP layer 852, and arrives at an Application layer 854.

Figure 9A:
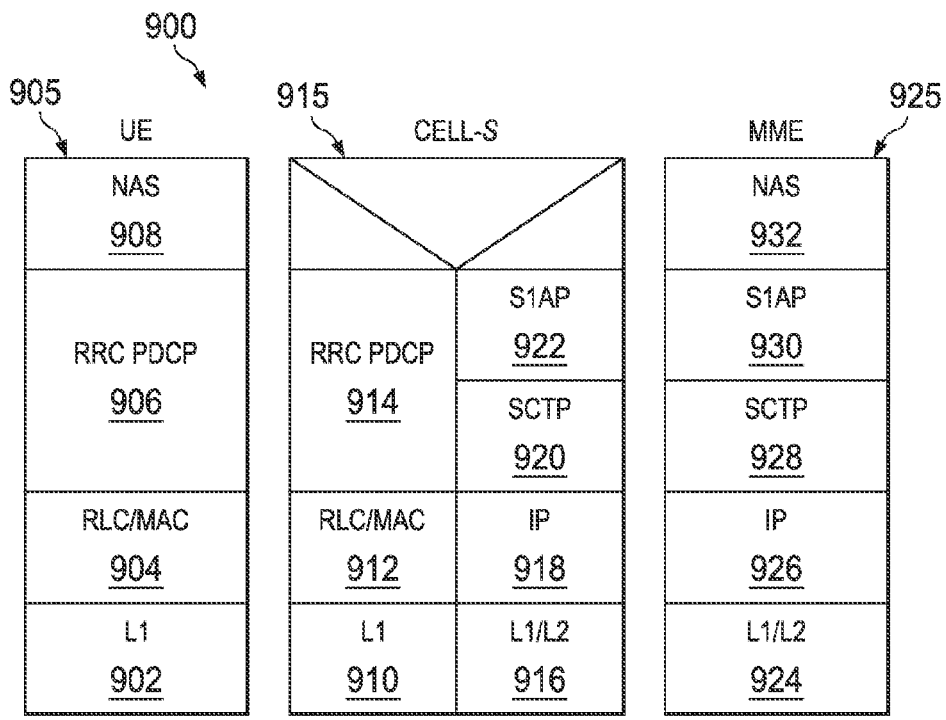
FIGS. 9a-b are schematic block diagrams illustrating example control plane protocol stacks.

FIG. 9a is a schematic block diagram 900 showing an example control plane protocol stack of access nodes and UE during the IHO state. In particular, a UE 905 is communicating with its serving cell 915 that is further connected to a MME (Mobility Management Entity) 925. On top of the protocol stack of the UE and the MME are Non-Access Stratum (NAS) layers 908 and 932 respectively. The NAS protocols support the mobility of the UE and the session management procedures to establish and maintain IP connectivity between the UE and a PDN GW. Under the NAS layer 908 of the UE, there can be a RRC PDCP layer 906, a RLC/MAC layer 904 and a L1 902. Accordingly, there are a RRC PDCP layer 914, a RLC/MAC layer 912 and a L1 910 at the serving cell 915, supporting the transmission of control plane traffic between the UE 905 and the serving cell 915.

Between the serving cell 915 and the MME 925, there may exist backhaul connection such as an S1 control interface. In such a case, the control plane protocol stacks of the serving cell 912 and the MME 925 contains S1-AP (S1 Application Protocol) layers 922 and 930, SCTP (Stream Control Transmission Protocol) layers 920 and 928, IP layers 918 and 926, and L1/L2 916 and 924, respectively. The S1-AP is the application layer protocol between an eNB and MME. It can support, among other things, mobility functions for UE, Paging, and NAS signaling transport function. SCTP is a common transport protocol that uses the services of IP to provide a reliable datagram delivery service to the adaptation modules, such as the SLAP. SCTP can provide reliable and sequenced delivery on top of the existing IP framework.

Figure 9B:
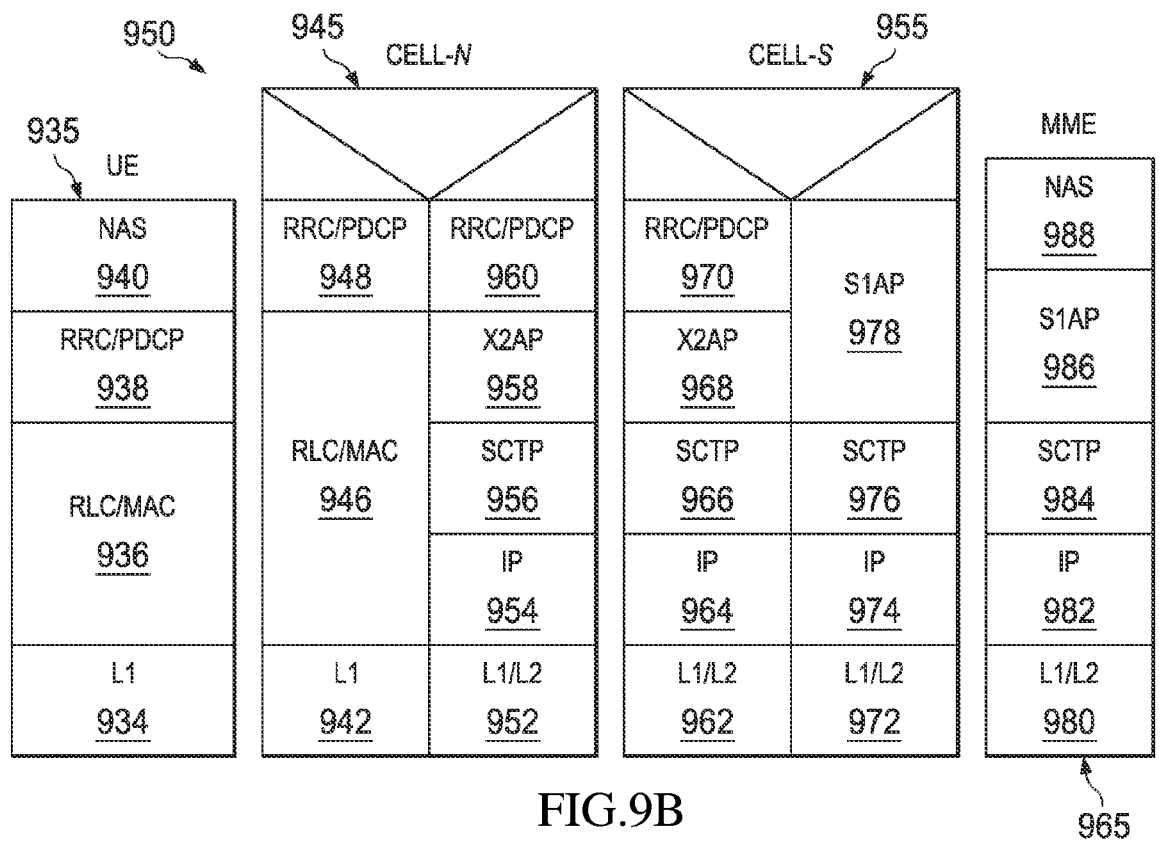

FIG. 9b is a schematic block diagram 950 showing an example control plane protocol stack of access nodes and UE during the IHO state. In particular, a UE 935 is communicating with a neighboring cell Cell-N 945. There can be a backhaul connection such as an X2 interface between the neighboring cell Cell-N 945 and the UE's serving cell Cell-S 955. The serving cell 955 is further connected to an MME (Mobility Management Entity) 965 via an S1 interface. The control plane protocols between the serving cell 955 and the MME 965, similar to the ones in FIG. 9a between the serving cell 915 and the MME 925, can include S1-AP layers 978 and 986, SCTP layers 976 and 984, IP layers 974 and 982, and L1/L2 972 and 980, at the serving cell 955 and the MME 965, respectively. The top layer of the control plane at the MME can be a NAS layer 988.

Between the neighboring cell 945 and the serving cell 955, the control plane on the X2 interface (X2-C interface) may include RRC/PDCP layers 960 and 970, X2-AP layers 958 and 968, SCTP layers 956 and 966, IP layers 954 an 964 and L1/L2 952 and 962, at the neighboring cell 945 and the serving cell 955, respectively. X2-AP protocol can be used to handle the UE mobility within E-UTRAN. During the RRC connection between the two cells, the PDCP packets carrying X2-AP message can be encrypted by the serving cell 9 and rerouted to the neighboring cell 9. SCTP is supported as the transport layer of between eNB-eNB pairs for transporting various signaling protocols over IP network. The IHO state can be established based on control signal exchange between the two cells via the X2-C interface.

Similar to the control plane protocols where the UE 905 is communicating with the serving cell 915 in FIG. 9a, the control plane protocols may include RRC PDCP layers 938 and 948, RLC/MAC layers 936 and 946, and L1 934 and 942 at the UE 935 and the neighboring cell 945. After receiving the PDCP packets containing control information from the serving cell 955, the neighboring cell 945 may process and send the PDCP packets to the UE 935. The data packets may go through various protocol layers between the neighboring cell and the UE and eventually reach a NAS layer 940 at the UE 935.

The protocol stacks shown in FIGS. 8 and 9 may be more relevant to the case where the pico/femto cells are directly connected to the network and having an X2 interface with other eNBs. In some other embodiments where there may be no direct X2 interface between the pico/femto cells (or eNBs), the information exchange can be performed via S1 interface involving the MME/SGW. Corresponding modifications, variations, and enhancement can be made to the example protocol stacks in FIGS. 8 and 9. For instance, protocol stacks related to the S1 interface between the eNB and the SGW/PDNGW/MME can replace the protocols related to the X2 interface as shown in FIGS. 8b and 9b between the neighboring cell and the serving cell where the UE is communicating with the neighboring cell.

In some embodiments, femto cells are connected to the network via H-GW such as shown in FIG. 5 where femto cells 530a-c are connected to the H-GW 550 via S1 interface 560a-c. In this case, the HeNB GW appears to the MME as an eNB. The HeNB GW appears to the eNB as another eNB. The HeNB GW shall connect to the EPC in a way that inbound and outbound mobility to cells served by the HeNB GW may not necessarily require inter MME handovers. X2 connections (e.g., 572a-b) may exist between HeNBs in a set. Under this scenario, X2-based handover between HeNBs is allowed if no access control at the MME is needed, i.e. when the handover is between closed/hybrid access HeNBs having the same CSG ID or when the target HeNB is an open access HeNB. An X2 connection (e.g., 570 in FIG. 5) can be introduced between HeNB GW and eNB. With this arrangement, the eNB that is within the coverage range of the HeNB which is supported by the HeNB GW can operate with the HeNB to execute the handoff process as described above. For example, handover process with enablement of IHO state can be established between the macro eNB 510 and the femto eNB 531a with corresponding control plane and user plane protocol stacks in place.

To facilitate the communications among the UE, the serving cell, and one or more neighboring cells, a pool of C-RNTIs (Cell Radio Network Temporary Identifier) can be allocated among neighboring cells for IHO operation. During the IHO state, the UE will be assigned to one of these C-RNTIs by the serving cell. In some implementations the C-RNTIs can be assigned dynamically. If the neighboring cell has the specific C-RNTI assigned by the serving cell to the UE available, then the same C-RNTI is used during the IHO. If there is a conflict, a new C-RNTI is negotiated with the serving cell and/or the neighboring cells.

To implement a HO procedure with IHO state, certain changes in signaling can be incorporated to coordinate the UE, the serving cell, and one or more candidate cells in initiating the IHO state, during the IHO state, and state transitions among the IHO, HO and STAY states.

Figure 10A:
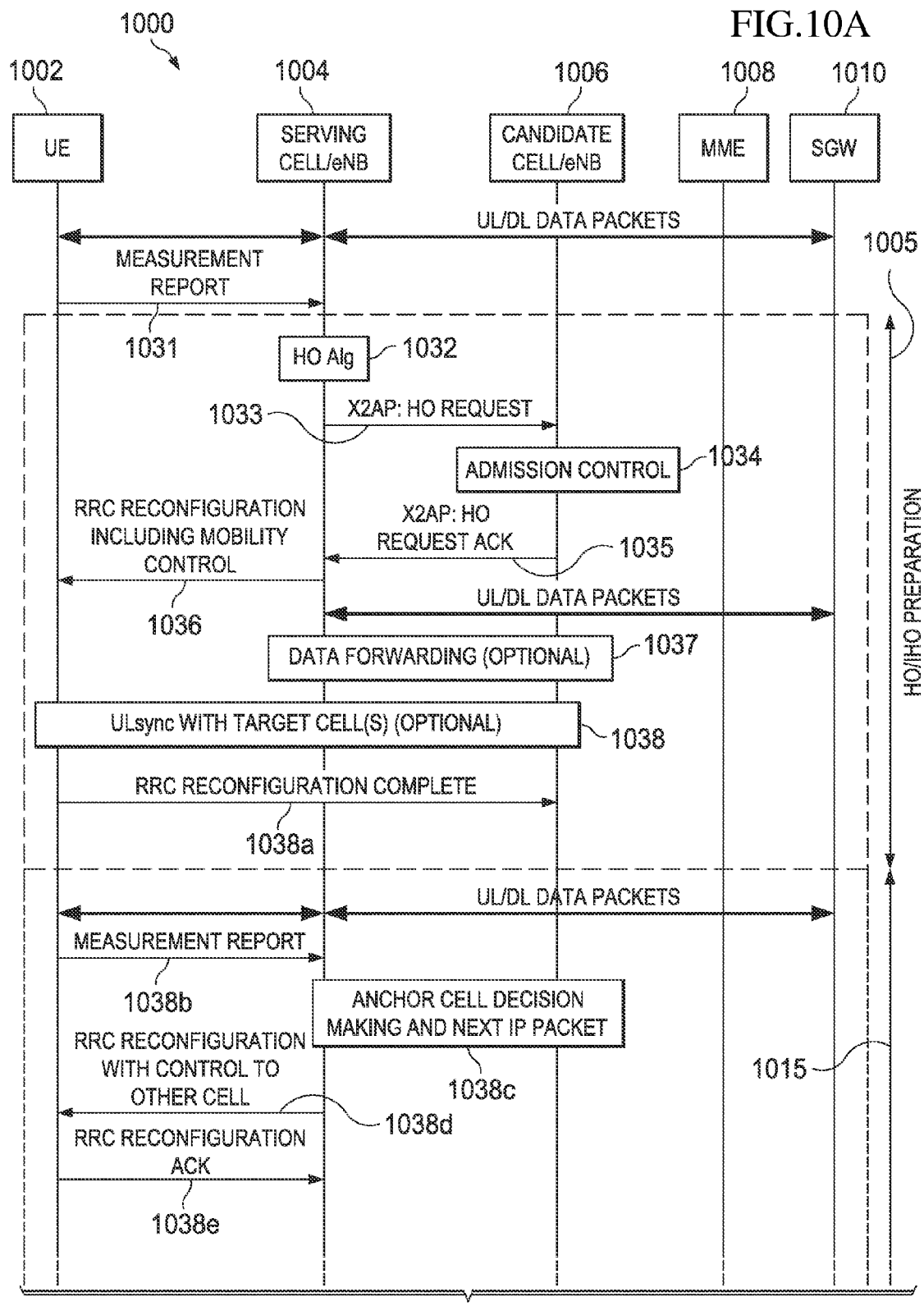
FIGS. 10a-b are a schematic flow diagram illustrating an example handover procedure with an IHO state.
Figure 10B:
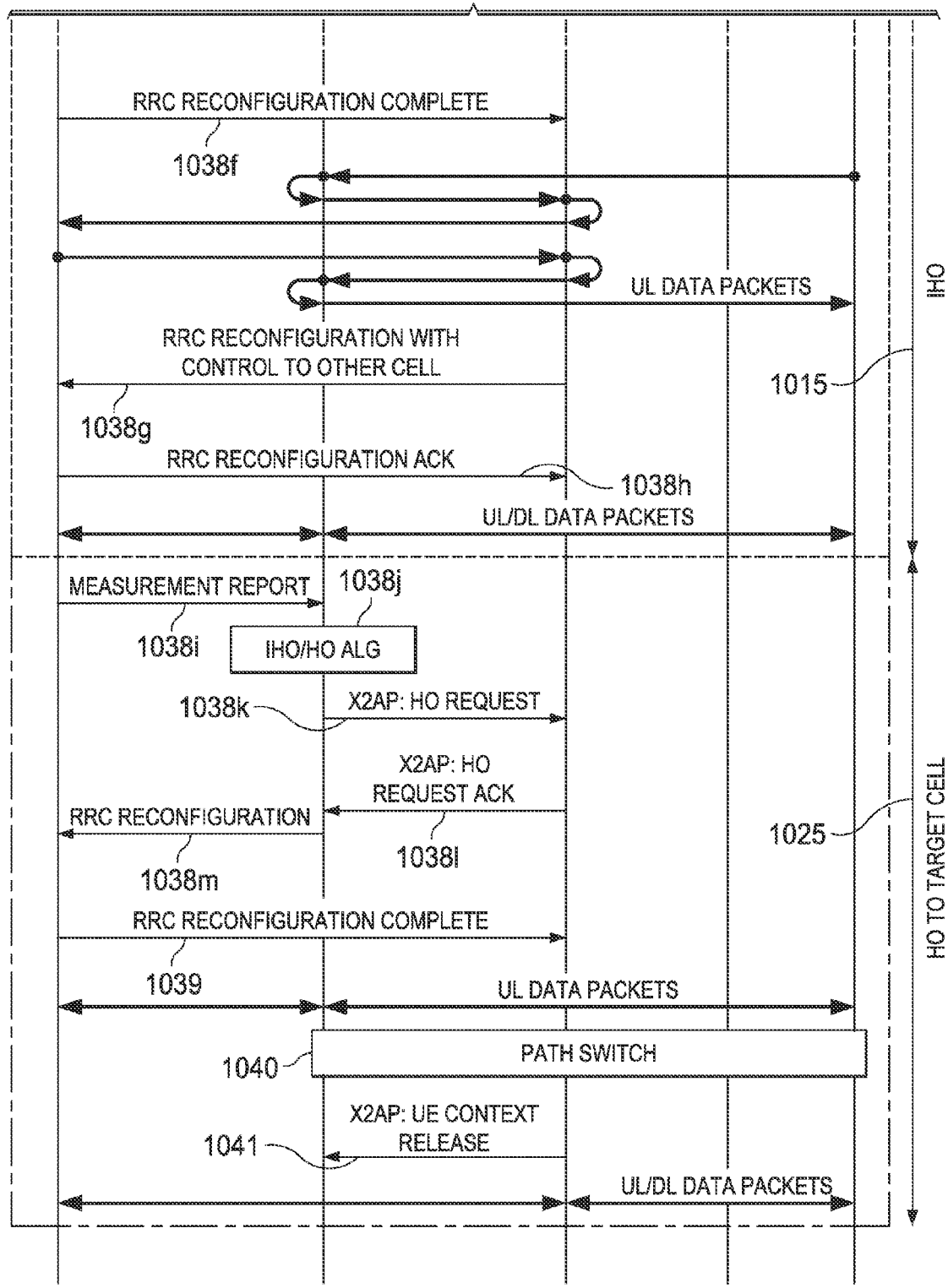

FIGS. 10a-b are a schematic flow diagram 1000 illustrating an example method for performing a handover mechanism involving an IHO state in a wireless communication network. The communication network may include a UE 1002, a serving cell/eNB 1004 of the UE, one or more IHO candidate cell/eNB 1006, MME 1008 and SGW 1010. The example HO procedure includes three stages: HO/IHO preparation stage 1005 where the network entities collaborate in initiating the IHO state, IHO state 1015, and HO to target cell stage 1025 where the UE in IHO state may exit the IHO state and move to a target cell (as shown in FIG. 10). In some other implementations, the UE may stay with the serving cell after exiting the IHO state (not shown).

In the HO/IHO preparation stage 1005, the UE 1002 maybe triggered to send a MEASUREMENT REPORT at step 1031 by the rules set by the system information, specification etc. The measurement report may contain a signal quality indicator that indicating quality of service (QoS) for the source base station and one or more neighboring base stations. As shown in FIG. 10, the MEASUREMENT REPORT is received by the serving cell 1004. Then the serving cell can make decision based on MEASUREMENT REPORT to initiate HO or IHO 1032.

The HO algorithm can be implementation specific. For example, QoS values with respect to the serving cell and neighbouring cells may be measured by the UE. In some implementations, the eNB may obtain a representation of the QoS by modifying the existing UE measurements, such as RSRP and/or RSRQ, with the additional performance monitoring on UE ACK/NACK feedback. Based on the measurements, the HO algorithm can determine what scenarios an IHO state should be initiated. During this procedure, if IHO is an appropriate state, at least a subset of the one or more neighboring base stations can be selected as candidate cells for enabling IHO state. The at least a subset of the one or more neighboring base stations can be identified based on the quality of service for the one or more neighboring base stations indicated in the measurement report. In some implementations, the IHO candidate cell selection method illustrated in FIG. 6b can be used.

In step 1033, the serving cell can issue a X2AP: HANDOVER REQUEST message to the IHO candidate cells. The serving cell may include necessary information in the handover request message to prepare the IHO at the candidate cell(s). For example, the handover request message may include at least the IDs of a set of candidate cells. The message may indicate, for instance, whether the intermediate HO (IHO) state is enabled or not, the expected duration of the IHO state, or any other appropriate indications.

Admission Control 1034 may be performed by the candidate cells dependent on the received E-RAB (EUTRAN Radio access bearers) QoS information to increase the likelihood of a successful HO/IHO, if the resources can be granted by the candidate cell. The candidate cell configures the required resources according to the received E-RAB QoS information and reserves a C-RNTI and optionally a RACH (Random Access Channel) preamble. The AS-configuration to be used in the candidate cell can either be specified independently (i.e. an "establishment") or as a delta compared to the AS-configuration used in the serving cell (i.e. a "reconfiguration"). If the X2AP: HANDOVER REQUEST message indicates that IHO is enabled, the admission control performed by the candidate cells may be different. The resources reserved at the candidate cells are normally time limited only for the duration of IHO. Furthermore, a scaling factor is used to estimate the fraction of the time that these resources are actually used. This scaling factor may be a function of the deployment scenario and configured by the OAM. For example, the scaling factor for three candidate cells may be set to ⅓. In this example, it is assumed that each candidate cell transmits/receives ⅓ of the IP packets to the UE during the IHO state.

Candidate cell prepares HO with L1/L2 and sends the HANDOVER REQUEST ACKNOWLEDGE to the serving cell in step 1035. The X2AP: HANDOVER REQUEST ACKNOWLEDGE message includes a transparent container to be sent to the UE as an RRC message to perform the handover/IHO. The container includes a new C-RNTI, target eNB security algorithm identifiers for the selected security algorithms, may include a dedicated RACH preamble, and possibly some other parameters i.e. access parameters, SIBs (System Information Blocks), etc. The X2AP: HANDOVER REQUEST ACKNOWLEDGE message may also include RNL (Radio Network Layer)/TNL (Transport Network Layer) information for the forwarding tunnels, if necessary. In this message the candidate eNB may also include an IHO state acceptance indicator. Basically the IHO state acceptance indicator can indicate whether the target eNB's willingness to participate in the support of IHO state. Furthermore, the candidate cell may indicate whether the UE is required to perform UL synchronization with the candidate cell or not. Normally this decision is dependent on the location of the UE and the coverage overlap of the serving and candidate cells.

The candidate eNB generates the RRC message to perform the handover or IHO, i.e RRCConnectionReconfiguration message including the mobilityControlInformation, to be sent by the serving eNB towards the UE. In step 1036, the serving eNB transmits the RRC reconfiguration message received from the target cell(s) to the UE. The RRC Reconfiguration message may include additional information to enable IHO state. The additional parameter may include the list of the IHO candidate cells, IHO timer, etc.

The serving eNB may start transmitting the unacknowledged data packets to the target eNB over X2_U interface in step 1037. These data packets may not be transmitted to the candidate cell if the UE stays in IHO state before performing HO to the candidate cell. However, any new IP packets (PDCP SDUs) are forwarded to the candidate cell's eNBs. The new IP packet forwarding can be performed selectively or multi-casted to all the candidate cells during the IHO duration.

After receiving the RRC Connection Reconfiguration message including the mobility Control Information, UE may enter IHO state if enabled. Before entering IHO state, the UE may optionally perform UL synchronization with the target cell(s) 1038. UL sync is performed only if the UE is instructed to do so. Upon entering the IHO state, the UE sends the RRC Connection Reconfiguration Complete to indicate that it has successfully accessed the candidate cell at step 1038a. This RRC Connection Reconfig Complete message is sent to all candidate cells after successfully accessing those cells. This message to each candidate cell may include the C-RNTI assigned by the respective candidate cell. If RRC Reconfig Complete message is not received by the candidate cell within a predefined time, the candidate cell may cancel UE's IHO state and inform that to the serving cell over X2 by sending X2: IHO Cancel message.

During the IHO state 1015, the UE receives from, and transmits to, only the anchor cell. The anchor cell is basically the cell actively transmitting to or receiving from the UE. Also while in the IHO state, any candidate cell, including the serving cell, may become the anchor cell. As illustrated in step 1038b-1038h, during the IHO state, the anchor cell may decide a next anchor cell based on the measurement reports from the UE 1002. If the anchor cell changes, there are corresponding IP packets forwarding to enable the anchor cell actively transmitting to or receiving from the UE. The steps 1038b-1038f illustrate an example IHO anchor transfer procedure where the first anchor cell is the serving cell 1004 and the second anchor cell is another candidate cell 1006. Further details are illustrated in FIGS. 11a-c in the following.

Figure 11A:
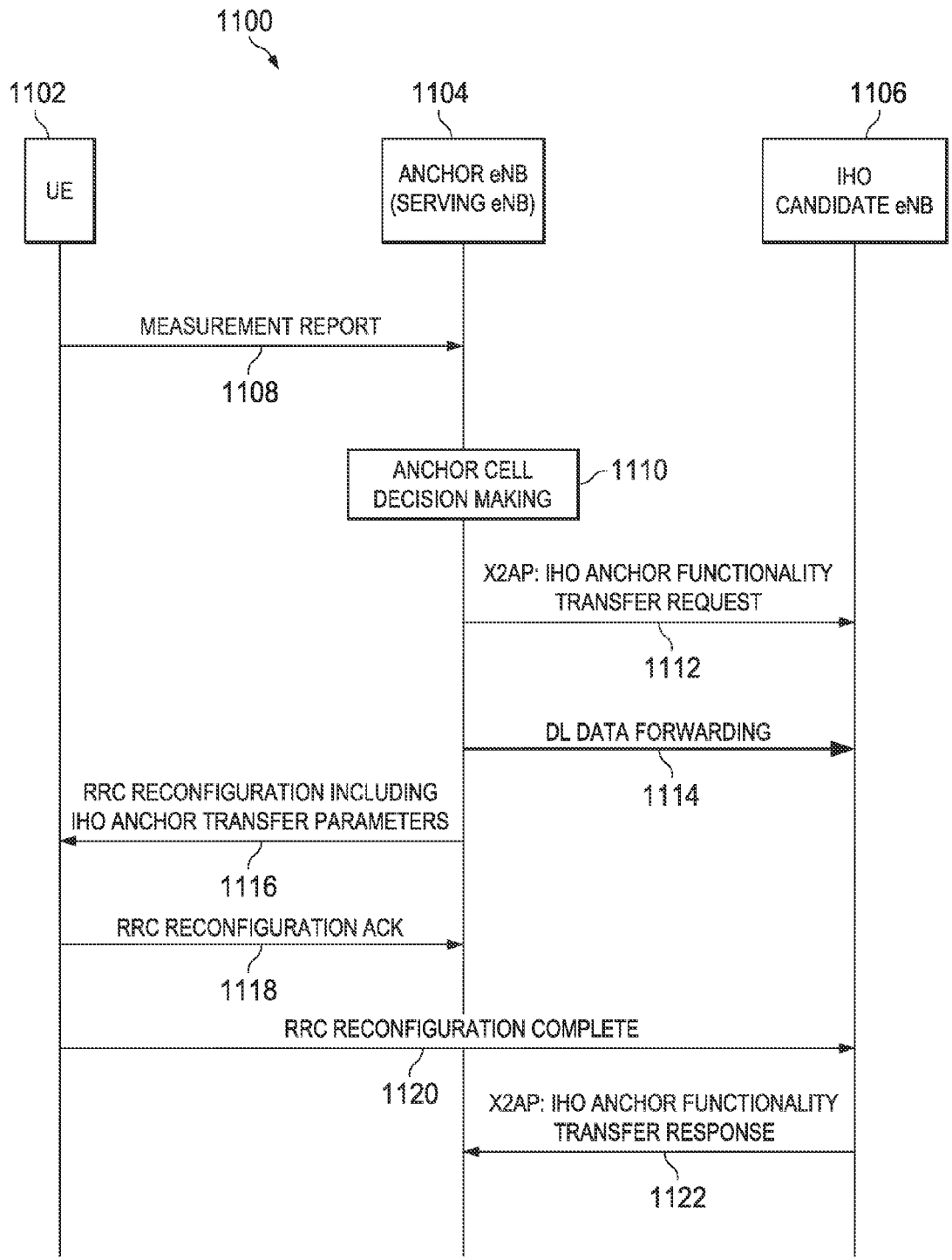
FIGS. 11a-c are schematic flow diagrams illustrating example IHO anchor transfer procedures.

FIG. 11a is a schematic flow diagram 1100 illustrating an example IHO anchor transfer procedure where the first anchor cell is the serving cell 1104 and the second anchor cell is another IHO candidate cell 1106. The UE 1102 may measure the signal quality with respect to the candidate cells, preferably periodically and report these measurements to the current anchor cell 1104 in step 1108. The anchor cell 1104 may further evaluate these measurements and may select a second anchor cell based on the used HO/IHO algorithm in step 1110. In this case, a candidate cell 1106 is selected as the second anchor cell. Then the first anchor cell 1104 may send X2AP: IHO anchor functionality transfer request message to the newly selected anchor cell in step 1112 and forward all the new downlink IP packets to the second anchor cell 1106 from the serving cell 1104 in step 1114. The first anchor cell 1104 may send an RRC Reconfiguration message to the UE to inform about the new anchor cell in step 1116. This RRC reconfiguration message is much shorter than the RRC reconfiguration message for initiating IHO or HO. Normally this message is shorter and just informs the UE about the ID of the second anchor cell. UE can listen to one of the candidate cells from a future subframe. Upon receiving this RRC Reconfiguration message with the candidate cell ID and the time to switch to the new anchor cell, the UE 1102 may send RRC reconfiguration acknowledgement to the current anchor cell 1104 in step 1118 and RRC reconfiguration of complete message to the new anchor cell 1106 in step 1120. Upon receiving the RRC reconfiguration complete message, the second anchor cell 1106 may send X2AP: IHO Anchor Functionality Transfer Response message to the first anchor cell in step 1122 and starts transmitting the data to the UE.

Figure 11B:
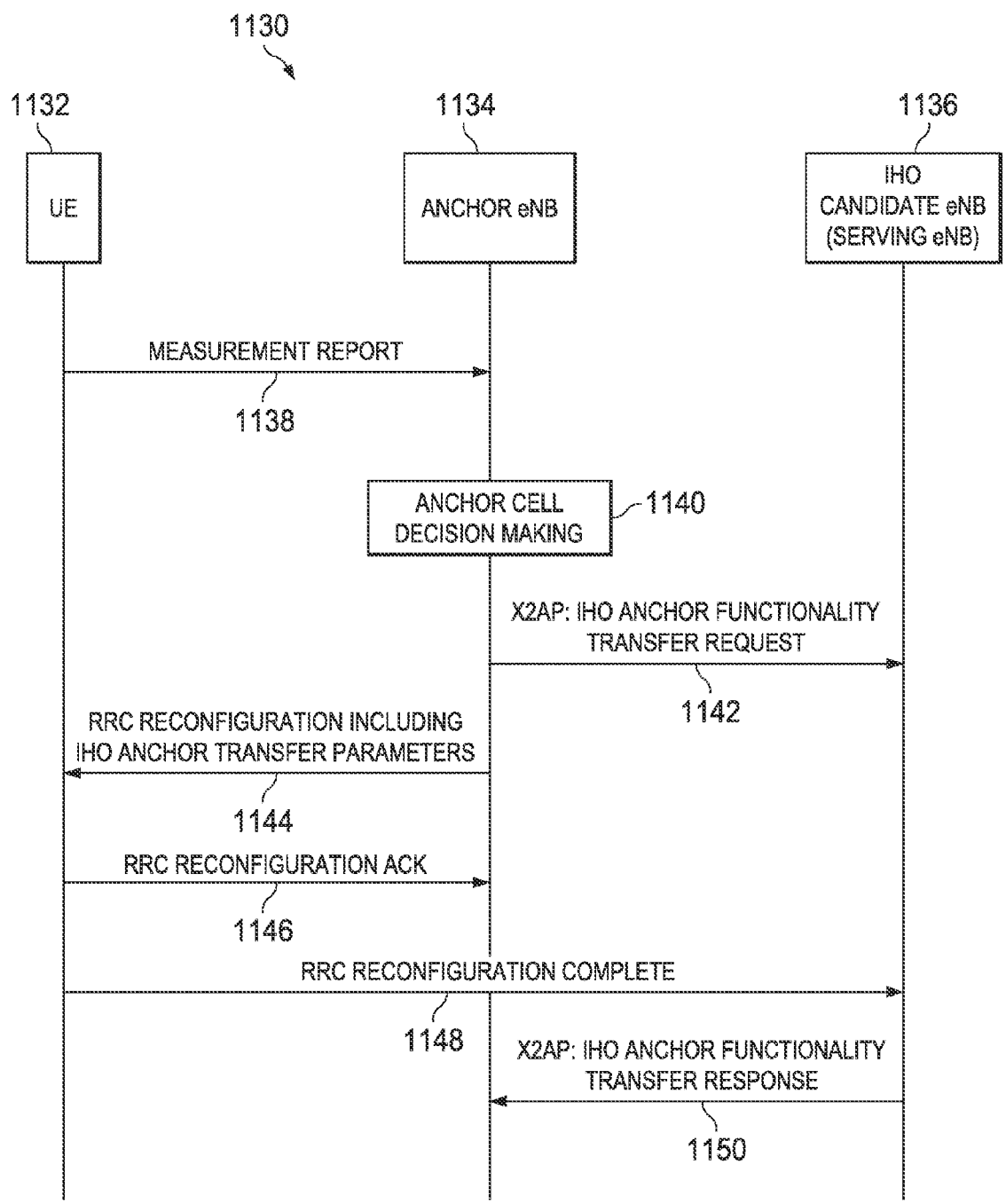

FIG. 11b is a schematic flow diagram 1130 illustrating an example IHO anchor transfer procedure where the first anchor cell is an IHO candidate cell 1134 and the second anchor cell is the serving cell 1136. The anchor transfer procedure can follow a series of steps 1138-1150 similar to the steps 1108 to 1122 except step 1114 in FIG. 11a because in this case the second anchor control is the serving cell 1136; and the new IP packets do not need to be forwarded.

Figure 11C:
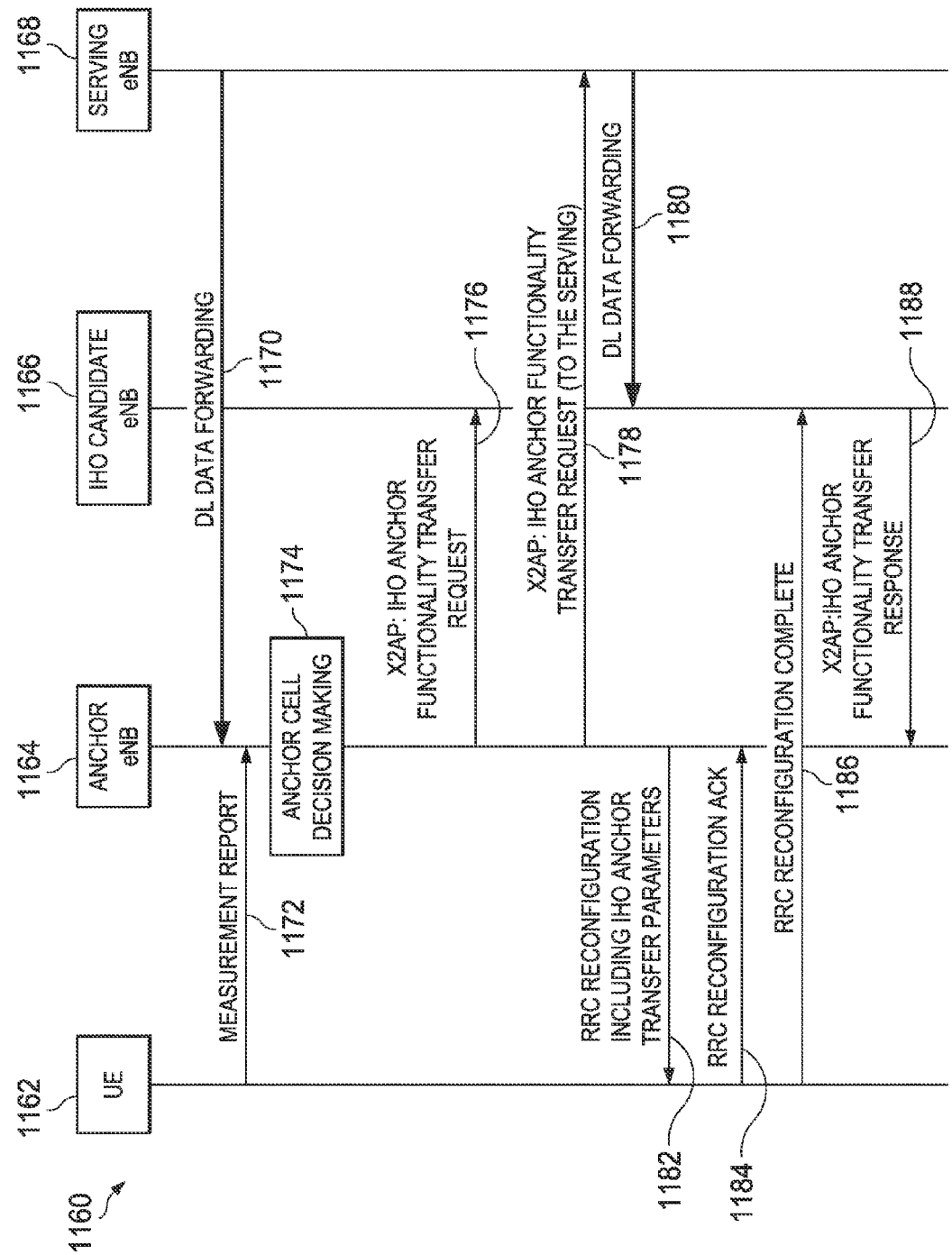

FIG. 11c is a schematic flow diagram 1100 illustrating an example IHO anchor transfer procedure where neither the first anchor cell nor the second anchor cell is the serving cell. As shown in FIG. 11c, the downlink data is first forwarded to the first anchor cell 1164 from the serving cell 1168. The UE 1162 reports quality measurements to the first anchor cell 1164 that performs anchor cell decision making 1174. If a candidate cell 1166 is determined to be the second anchor cell, the first anchor cell 1164 may send X2AP: IHO Anchor Functionality Transfer Request to the new anchor cell 1166 and the serving cell 1168 in steps 1176 and 1178, respectively. With the notice of the anchor cell change, the serving cell then forward downlink data to the second anchor cell 1166 in step 1180. The first anchor cell may also send an RRC Reconfiguration message to the UE in step 1182 to inform about the second anchor cell 1166. The UE 1162 may send RRC reconfiguration acknowledgement to the current anchor cell in step 1118 and RRC reconfiguration of complete message to the new anchor cell 1166 in step 1194. Upon receiving the RRC reconfiguration complete message, the second anchor cell 1166 may send X2AP: IHO Anchor Functionality Transfer Response message to the first anchor cell 1162 in step 1188 and starts transmitting the data to the UE.

Referring back to the FIG. 10, while in the IHO state, if UE determines that the QoS from the candidate cell is consistently above the required QoS requirement and also significantly better than the QoS that can be obtained from the serving cell, UE may send an updated measurement report to the anchor cell in step 1038j. Subsequently, the anchor cell may perform HO/IHO algorithm in step 1038h and trigger HO to one of the candidate cells (i.e. HO target cell) as shown in HO to handover stage 1015 including steps 1038j to 1038m. In the illustrated example in FIG. 10, the serving cell 1004 may send the X2AP: HO request to the target cell 1006 in step 1038k. When the UE is handed over to one of the candidate cells, the X2AP: HO request is simplified since the UE context is already available at the target cell. In step 1138i, the target cell 1006 may reply to the serving cell 1004 with a X2AP: HO Request acknowledgement. The serving cell can then send a RRC reconfiguration message to the UE 1002 informing about the handover to the target cell 1006 in step 1038m.

When the UE has successfully accessed the target cell, the UE 1102 sends the RRC Connection Reconfiguration Complete message (including a C-RNTI) to confirm the handover in step 1139, along with an uplink Buffer Status Report, whenever possible, to the target eNB to indicate that the handover procedure is completed for the UE. The target eNB verifies the C-RNTI sent in the RRC Connection Recon-figuration Complete message. When the UE is moving to the target cell from IHO state and the target cell is one of the IHO candidate cells, then the above messages are simplified since the UE context is already available at the target cell.

Subsequently, path switch 1040 can be performed among the source eNB, the target eNB and the MME. Specifically, the target eNB 1006 sends a S1AP: PATH SWITCH message to MME to inform that the UE has changed cells. The MME sends an UPDATE USER PLANE REQUEST message to the Serving Gateway. The Serving Gateway switches the downlink data path to the target side. The Serving gateway sends one or more "end marker" packets on the old path to the source eNB and then can release any U-plane/ TNL resources towards the source eNB. Serving Gateway sends an UPDATE USER PLANE RESPONSE message to MME. The MME confirms the S1AP: PATH SWITCH message with the S1AP: PATH SWITCH ACKNOWLEDGE message. The target eNB starts making the scheduling decisions on the new packets received for this point.

By sending X2AP: UE CONTEXT RELEASE in step 1041, the target eNB 1006 informs success of HO to source eNB 1004. The target eNB 1006 sends this message after the S1AP: PATH SWITCH ACKNOWLEDGE message is received from the MME. Now the target cell is the new serving cell of the UE 1002 and the uplink/downlink data packets of the UE 1002 are routed through the new serving cell 1006 to/from MME 1008.

Note that in the example of FIG. 10, UE reports the measurements to the serving cell. In some embodiments, the UE can report the measurements to one of the candidate cells and thus the HO decision is made at the candidate cell. In some implementations, the measurement report may be forwarded to the serving cell.

Figure 12A:
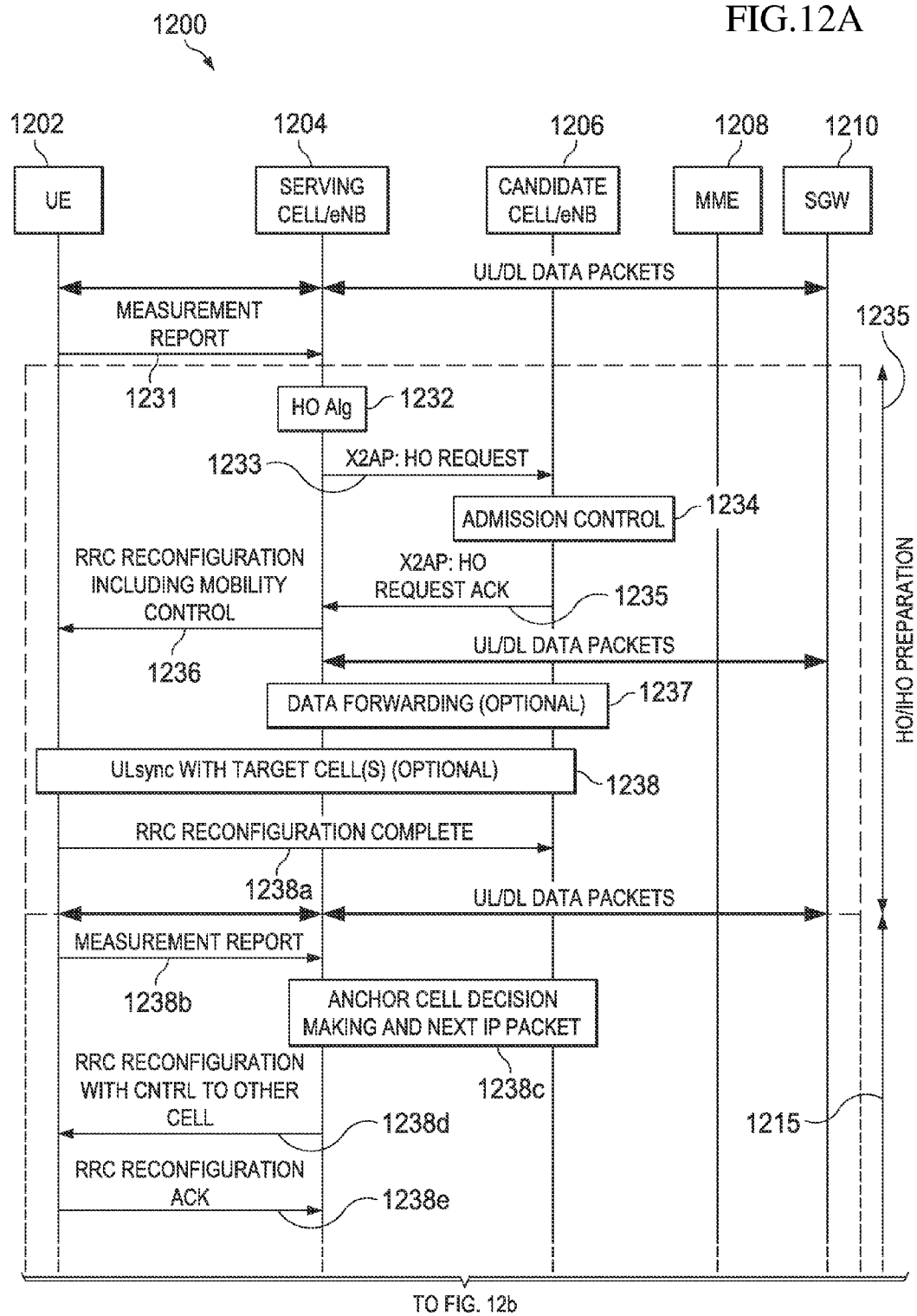
FIGS. 12a-b are schematic flow diagrams illustrating example handover procedures with an IHO state.
Figure 12B:
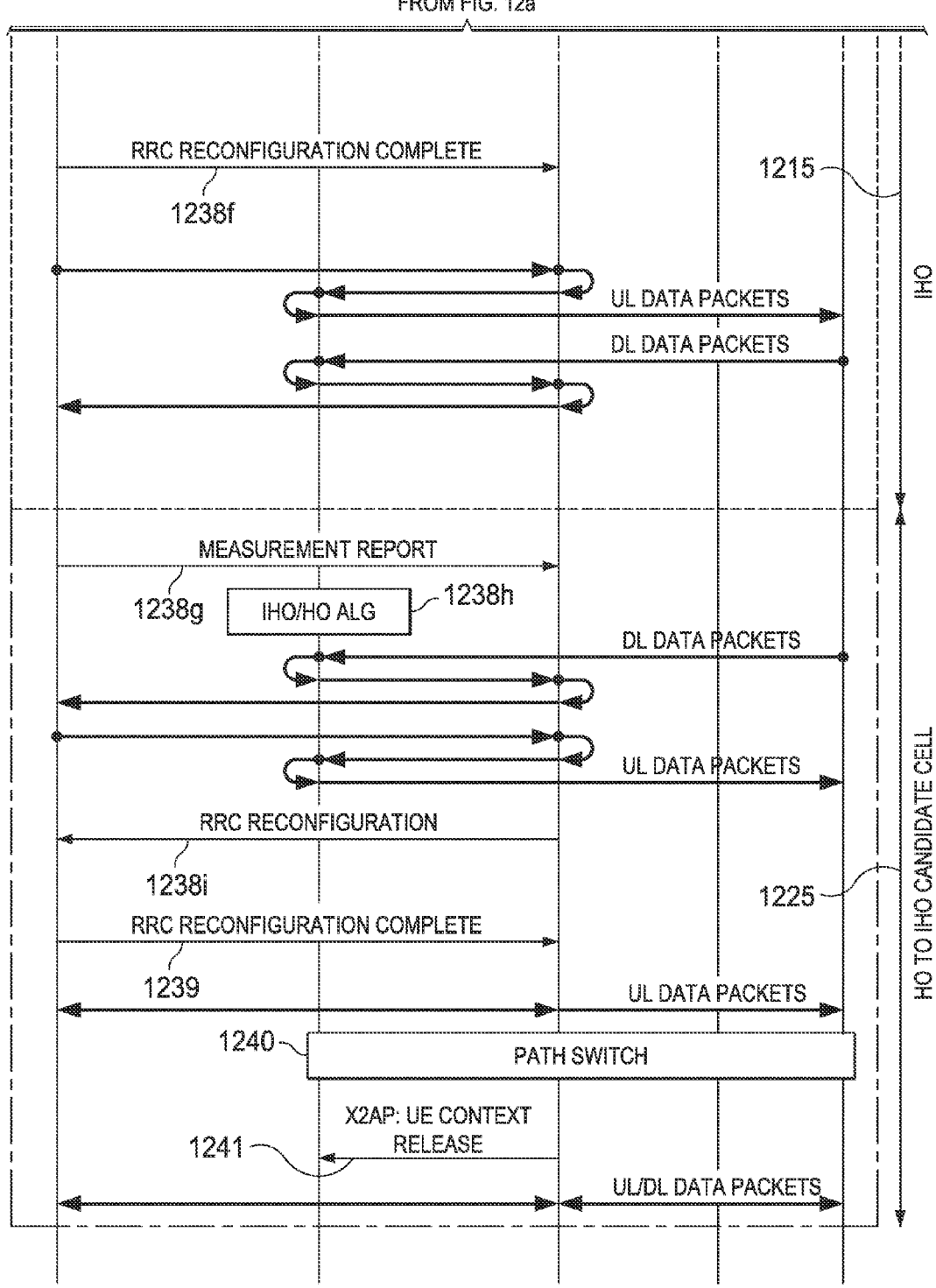

FIGS. 12a-b are a schematic flow diagram 1200 illustrating an example handover procedure where the measurement report is received by one of the IHO candidate cell. The handover procedure with IHO state shown in FIG. 12 is substantially the same as the one of FIG. 11, except that the measurement report is received by the IHO candidate cell 1206 from the UE 1202; and hence the IHO to HO algorithm is performed at the candidate cell 1206 in step 1238h, rather than at the serving cell 1004 in step 1038h in FIG. 10.

As shown in FIGS. 10 and 12, the decision of moving to one of the candidate cells (i.e. a target cell) or staying with the serving cell when the UE is IHO state is made by the network (either the serving cell or on candidate cell). In some other embodiments, the UE can determine whether to perform HO when it is in IHO state.

Figure 13A:
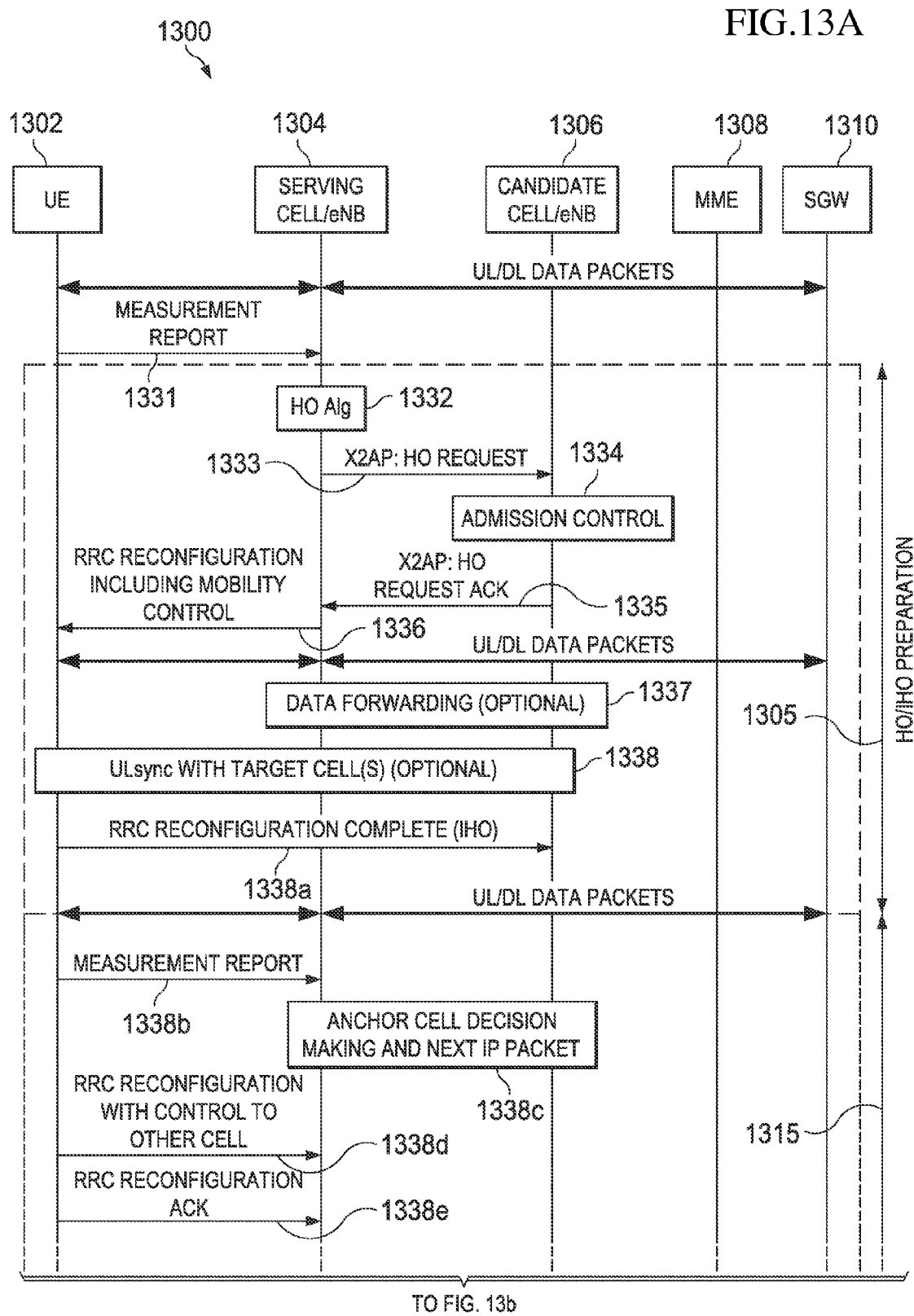
FIGS. 13a-b are schematic flow diagrams illustrating example handover procedures with an IHO state.
Figure 13B:
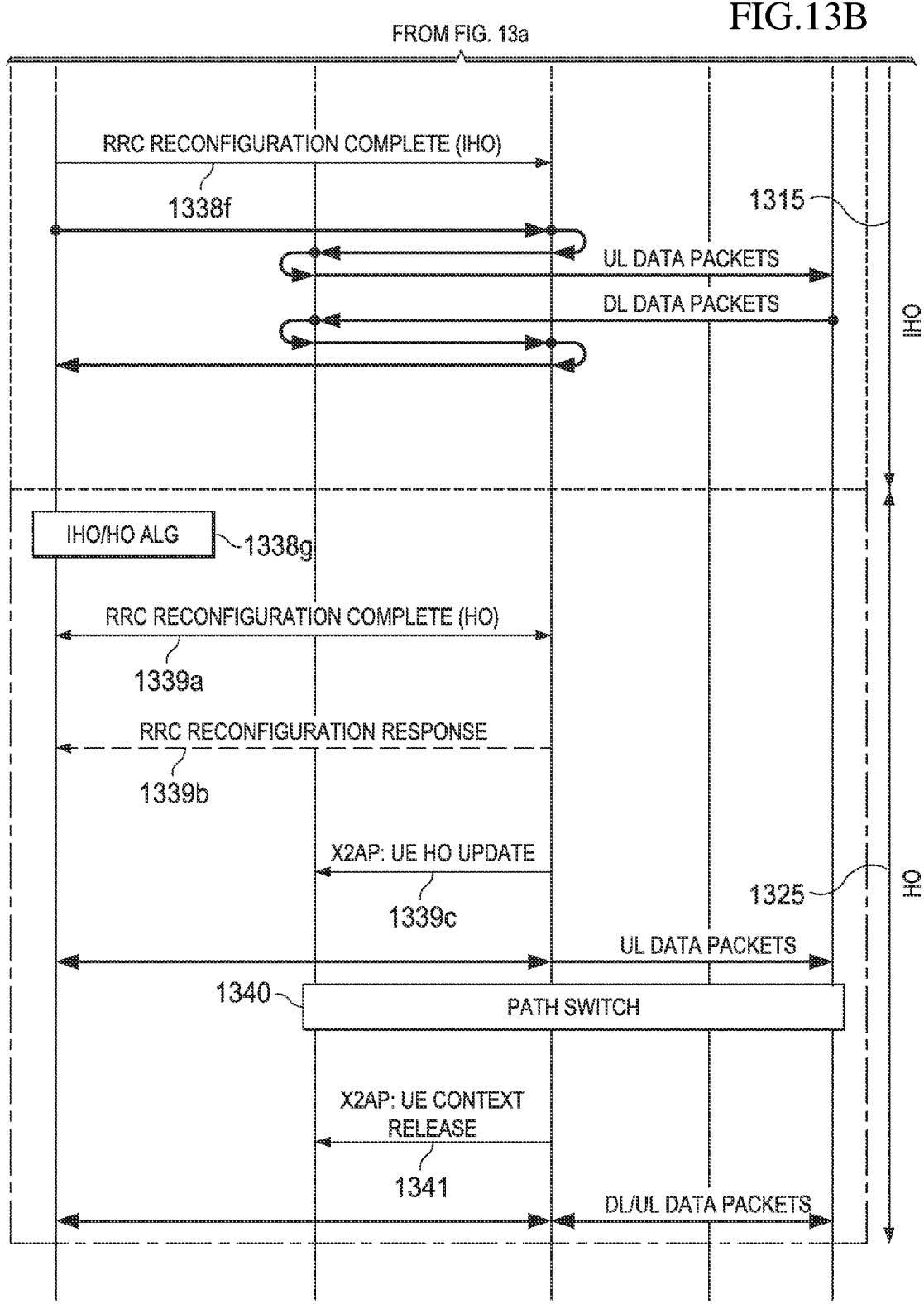

FIGS. 13a-b are a schematic flow diagram 1300 illustrating an example handover procedure with IHO state with UE initiated HO. In the illustrated example is for scenario, the UE requests HO to a candidate cell, when the candidate cell is the current anchor cell. The steps 1331-138f are substantially the same as steps 1031-103f in FIG. 10 described above and hence will be described further only to the extent necessary to illustrate the UE initiated HO case.

After the IHO state is established, in step 1338g, after measuring the expected signal quality with respect to all the candidate cells, the UE 1302 may evaluate a HO criterion and decide to indicate to the candidate cell 1306 that HO is preferred. Since the UE context is already available at the candidate cell, HO procedure is simplified. The HO criterion may be partially controlled or suggested by the EPC/serving eNB.

In step 1339a, the UE 1302 can send the RRC Connection Reconfiguration Complete message to the target eNB 1306 indicating that the handover is preferred. The target eNB 1306 may respond by sending an RRC Reconfiguration response to the UE in step 1339*b* and further sends X2AP: UE HO Update to the UE's serving cell 1304 in step 1339*c*. This may trigger cancellation of the IHO by the UE's serving cell 1304.

In step 1340, the target eNB 1306 can send a PATH SWITCH message to MME 1308 to inform that the UE has changed cells. The MME sends an UPDATE USER PLANE REQUEST message to the Serving Gateway. The Serving Gateway switches the downlink data path to the target side. The Serving gateway sends one or more "end marker" packets on the old path to the source eNB and then can release any U-plane/TNL resources towards the source eNB. Serving Gateway sends an UPDATE USER PLANE RESPONSE message to MME. The MME confirms the PATH SWITCH message with the PATH SWITCH ACKNOWLEDGE message. The target eNB starts making the scheduling decisions on the new packets received for this point.

By sending UE CONTEXT RELEASE, the target eNB 1306 informs success of HO to source eNB 1304. The target eNB 1306 sends this message after the PATH SWITCH ACKNOWLEDGE message is received from the MME in step 1340.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Variations, modifications, and enhancements to the described examples and implementations and other implementations can be made based on what is disclosed.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method performed at a first base station of a wireless communications network, the method comprising:
   receiving an indication that a user equipment (UE) is receiving coverage signal from a second base station;
   forwarding data packets destined for the UE to the second base station;
   maintaining a RRC_connected state with the UE after forwarding the data packets destined for the UE to the second base station, wherein maintaining the RRC_connected state with the UE comprises:
      sending, from the first base station to the UE, a first Radio Resource Control (RRC) message after forwarding the data packets; and
      in response to the first RRC message, receiving, at the first base station, a second RRC message from the UE;
   receiving a data packet destined for an Evolved Packet Core (EPC) from the second base station;
   decrypting the data packet destined for the EPC to form Packet Data Convergence Protocol (PDCP) Service Data Unit (SDU);
   forwarding the data packet destined for the EPC to the EPC; and
   maintaining a communications link with the UE after forwarding the data packet destined for the EPC from the second base station.

2. The method of claim 1, wherein the indication is a quality of service indicator.

3. The method of claim 1, wherein the coverage signal includes one or more of: a reference signal, a system information broadcast signal, or a data transmission signal transmitted by a base station.

4. The method of claim 1, wherein forwarding the data packets destined for the UE further comprises:
   receiving a data packet destined for the UE from an Evolved Packet Core (EPC);
   encrypting the data packet destined for the UE to form PDCP PDU; and
   forwarding the encrypted data packet destined for the UE to the second base station.

5. The method of claim 1, wherein forwarding the data packets destined for the UE to the second base station is performed across one or more of an X2 interface or an S1 interface.

6. The method of claim 1, wherein maintaining the RRC_connected state with the UE includes reserving a C-RNTI assigned to the UE for the first base station.

7. The method of claim 1, further comprising:
   receiving an indication that the coverage signal from the second base station is stronger than a coverage signal from the first base station;
   handing over control of communications for the UE to the second base station; and
   terminating the communications link with the UE.

8. The method of claim 7, wherein the indication is a quality of service indicator.

9. A base station in a wireless communications network, the base station configured to:
   receive an indication that a user equipment (UE) is receiving coverage signal from a second base station;
   forward data packets destined for the UE to the second base station;
   maintaining a RRC_connected state with the UE after forwarding the data packets destined for the UE to the second base station, wherein maintaining the RRC_connected state with the UE comprises:
      sending, from the base station to the UE, a first Radio Resource Control (RRC) message after forwarding the data packets; and
      in response to the first RRC message, receiving, at the base station, a second RRC message from the UE;
   receiving a data packet destined for an Evolved Packet Core (EPC) from the second base station;

decrypting the data packet destined for the EPC to form Packet Data Convergence Protocol (PDCP) Service Data Unit (SDU);

forwarding the data packet destined for the EPC to the EPC; and maintaining a communications link with the UE after forwarding the data packet destined for the EPC from the second base station.

10. The base station of claim 9, wherein the indication is a quality of service indicator.

11. The base station of claim 9, wherein the coverage signal includes one or more of: a reference signal, a system information broadcast signal, or a data transmission signal transmitted by a base station.

12. The base station of claim 9, wherein forwarding the data packets destined for the UE further comprises:

receiving a data packet destined for the UE from an EPC;

encrypting the data packet destined for the UE to form PDCP PDU; and forwarding the encrypted data packet destined for the UE to the second base station.

13. The base station of claim 9, wherein forwarding the data packets destined for the UE to the second base station is performed across one or more of an X2 interface or an S1 interface.

14. The base station of claim 9, wherein maintaining the RRC_connected state with the UE includes reserving a C-RNTI assigned to the UE for the first base station.

15. The base station of claim 9, further configured to:

receive an indication that the coverage signal from the second base station is stronger than a coverage signal from the base station;

hand over control of communications for the UE to the second base station; and terminate the communications link with the UE.

16. The base station of claim 15, wherein the indication is a quality of service indicator.

* * * * *